US011966480B2

(12) United States Patent
Hendrickson et al.

(10) Patent No.: US 11,966,480 B2
(45) Date of Patent: Apr. 23, 2024

(54) FAIRLY UTILIZING MULTIPLE CONTEXTS SHARING CRYPTOGRAPHIC HARDWARE

(71) Applicant: NVIDIA Corporation, Santa Clara, CA (US)

(72) Inventors: Adam Hendrickson, Morgan Hill, CA (US); Vaishali Kulkarni, Sunnyvale, CA (US); Gobikrishna Dhanuskodi, Santa Clara, CA (US); Naveen Cherukuri, San Jose, CA (US); Wish Gandhi, Sunnyvale, CA (US); Raymond Wong, Palo Alto, CA (US)

(73) Assignee: Nvidia Corporation, Santa Clara, CA (US)

( * ) Notice: Subject to any disclaimer, the term of this patent is extended or adjusted under 35 U.S.C. 154(b) by 259 days.

(21) Appl. No.: 17/654,355

(22) Filed: Mar. 10, 2022

(65) Prior Publication Data

US 2023/0289453 A1 Sep. 14, 2023

(51) Int. Cl.

| | |
|---|---|
| ***G06F 21/00*** | (2013.01) |
| ***G06F 13/16*** | (2006.01) |
| ***G06F 13/28*** | (2006.01) |
| ***G06F 21/60*** | (2013.01) |
| ***G06F 21/79*** | (2013.01) |
| ***G06N 3/04*** | (2023.01) |
| ***H04L 9/06*** | (2006.01) |
| *G06F 21/10* | (2013.01) |

(52) U.S. Cl.

CPC ........ *G06F 21/602* (2013.01); *G06F 13/1673* (2013.01); *G06F 13/28* (2013.01); *G06F 21/79* (2013.01); *G06N 3/04* (2013.01); *H04L 9/0637* (2013.01); *H04L 9/0643* (2013.01); *G06F 21/107* (2023.08)

(58) Field of Classification Search

None

See application file for complete search history.

(56) References Cited

U.S. PATENT DOCUMENTS

2007/0294496 A1* 12/2007 Goss .................. H04W 12/102 711/163
2022/0050797 A1* 2/2022 Dreier .................. G06F 12/023

* cited by examiner

*Primary Examiner* — Andrew J Steinle
(74) *Attorney, Agent, or Firm* — Lowenstein Sandler LLP

(57) ABSTRACT

Apparatuses, systems, and techniques for supporting fairness of multiple context sharing cryptographic hardware. An accelerator circuit includes a copy engine (CE) with AES-GCM hardware configured to perform both encryption and authentication of data transfers for multiple applications or multiple data streams in a single application or belonging to a single user. The CE splits a data transfer of a specified size into a set of partial transfers. The CE sequentially executes the set of partial transfers using a context for a period of time (e.g., a timeslice) for an application. The CE stores in a secure memory for the application one or more data for encryption or decryption (e.g., a hash key, a block counter, etc.) computed from a last partial transfer. The one or more data for encryption or decryption are retrieved and used when data transfers for the application is resumed by the CE.

20 Claims, 10 Drawing Sheets

800

Start

802 Receive a first descriptor of a first data transfer associated with a first application, the first descriptor specifying an index 804 Split the first data transfer into a first set of portions 806 Execute, during a first period, a first subset of the first set of portions 808 Store, at an end of the first period, a first computed hash key and a first block counter in the secure memory at the specified index 810 Execute, during a second period, a second subset of the first set of portions 812 Store, at an end of the second period, a first authentication tag associated with the first data transfer End

FAIRLY UTILIZING MULTIPLE CONTEXTS SHARING CRYPTOGRAPHIC HARDWARE

TECHNICAL FIELD

At least one embodiment pertains to processing resources used to perform and facilitate confidential data transfers. For example, at least one embodiment pertains to hardware circuits for fairly utilizing of multiple contexts sharing cryptographic hardware.

BACKGROUND

Accelerator circuits include direct memory transfer (DMA) circuits to access system memory independently of a central processing unit (CPU). The DMA circuits can also be used for memory-to-memory copying or moving of data within memory or between memories. When data needs to be protected, the DMA circuits can implement cryptographic circuits to encrypt and decrypt data being copied from and to secure memory. Some cryptographic algorithms use sequential operations that require data to be sequentially analyzed. These sequential operations introduce some challenges for sharing the cryptographic circuitry by multiple clients, such as when an accelerator circuit in a data center is shared among multiple users. Some implementations place restrictions on transfer size to support fairness in arbitrating across uses. This is not ideal as some transfer sizes are very large, whereas some transfer sizes are very small in comparison. Alternatively, some implementations create an authentication tag and use separate initialization vectors (IVs) for each block in the encrypted data stream. This, however, increases the memory footprint to utilize the cryptographic hardware.

DETAILED DESCRIPTION

Figure 1:
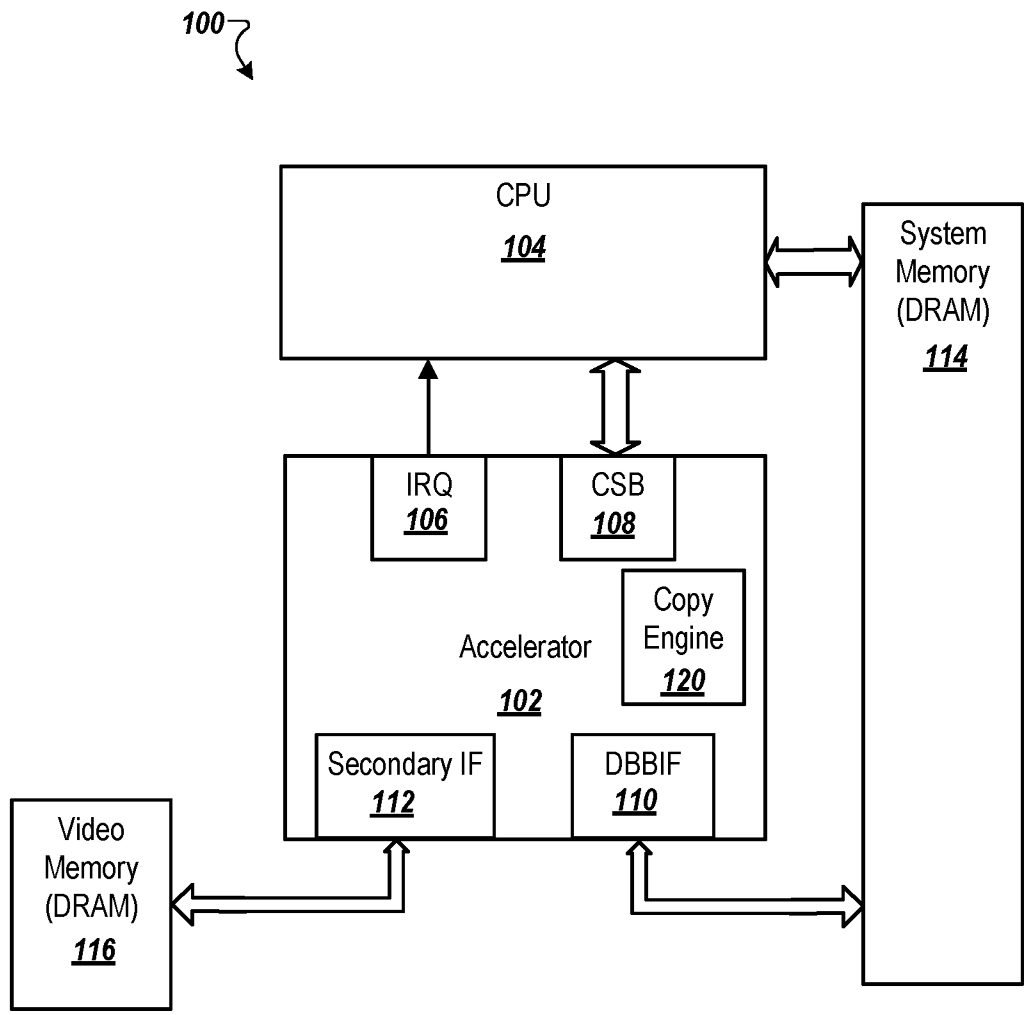
FIG. 1 is a block diagram of a computing system with an accelerator circuit including a copy engine that supports fairness among multiple users of the accelerator circuit or multiple data streams in a single application or belonging to a single user, in accordance with at least some embodiments.

As described above, DMA circuits can be used for memory-to-memory copying or moving of data within memory and can include cryptographic hardware to protect data. The sequential cryptographic algorithms that use sequential operations introduce some challenges for sharing the cryptographic hardware by multiple clients. In particular, Advanced Encryption Standard Galois Counter Mode (AES-GCM) is an authenticated encryption algorithm that performs both encryption and authentication of data streams. Hardware implementations for AES-GCM circuits are expensive due to the 128-bit multipliers required per 16 Bytes needed to be simultaneously encrypted. AES-GCM is a sequential operation that requires data to be sequentially analyzed to compute the GHASH function. A single AES key K is used to both encrypt data and derive authenticated data. The component that GCM uses to produce a message authentication code is called GHASH. If multiple users are attempting to utilize the AES-GCM hardware engine, the operations for one user are serialized and completed before operations for another user are serialized and completed due to state tracking needed for a block counter, an initialization vector (IV), a key (KEY), and GHASH. This does not guarantee any fairness among the users as one transfer for one user can be significantly larger than another transfer for another user. Also, if a single user or application is attempting to utilize the AES-GCM hardware engine for multiple crypto-streams belonging to the user or within the application, the operations for one crypto-stream is serialized and completed before operations for the other crypto-stream is serialized and completed due to the state tracking needed for the block counter, the IV, the key, and GHASH. This does not guarantee any fairness to the multiple crypto-streams within an application.

Aspects and embodiments of the present disclosure address these and other challenges by providing a scheduler circuit that splits data transfers into a set of partial transfers (or portions) (e.g., 8 KB), where each partial transfer has a fixed size and has a requirement to be completed before a context switch to another application once started. A copy engine (CE) can sequentially execute the set of partial transfers using a first context for a period of time (e.g., until a timeslice timeout occurs) for a first application. The CE stores in a secure memory for the application one or more data for encryption or decryption (e.g., a hash key, a block counter, etc.) computed from a last partial transfer (e.g., last partial transfer completed before the timeslice timeout). The IV values do not change throughout a single copy, and a counter is appended to the IV and increments once per a specified block. For example, the IV can be 96 bits, and the counter can be a 32-bit counter that is incremented once per 16-byte block. The one or more data for encryption or decryption are retrieved and used when data transfers for the application is resumed by the CE (e.g., for a subsequent timeslice). The CE sequentially executes the remaining partial transfers using the retrieved values for a second period (e.g., until another timeslice timeout). Once all the partial transfers are completed, the CE stores or outputs an authentication tag computed in a last partial transfer of the set of partial transfers. In this manner, an accelerator circuit supports fairness of multiple contexts sharing cryptographic hardware. The accelerator circuit can guarantee fairness of multiple context sharing cryptographic hardware in some cases. The accelerator circuit can be a graphics processing unit (GPU), a deep learning accelerator (DLA) circuit, an intelligence processing unit (IPU), a neural processing unit (NPU), a tensor processing unit (TPU), a neural network processor (NNP), a data processing unit (DPU), a vision processing unit (VPU), an application-specific integrated circuit (ASIC), or a field-programmable gate array (FPGA). Accelerator circuits can address the computational demands of the neural network inference stage by providing building blocks that accelerate core deep learning operations. A deep learning accelerator, for example, can be used to accelerate different neural networks, such as convolutional neural networks (CNNs), recurrent neural networks (RNN), fully connected neural networks, and so on.

An accelerator circuit can be scheduled by a host central processing unit (CPU) coupled to the accelerator circuit. Alternatively, the accelerator circuit can be scheduled locally by firmware to ensure minimum latency. The accelerator circuit can be used for different types of layers in these neural networks, such as fixed-function engines for convolutions, activation functions, pooling, batch normalization, or the like. It should be noted that a neural network from an algorithmic perspective can be specified with one set of layers (referred to herein as "original layers") such as bias and batch normalization. Those original layers can be compiled or transformed into another set of layers (referred to herein as "hardware layers") where each hardware layer is used as a basic element for scheduling to be executed on an accelerator circuit. The mapping between original layers and hardware layers can be m:n, where m is the number of original layers and n is the number of hardware layers. For example, in a neural network, original layers bias, batch normalization and local response normalization (LRN), such as a rectified linear unit (ReLU), can be compiled into one hardware layer. In that case, the m:n is 3:1. Each hardware layer can be represented by a basic hardware instruction for the accelerator circuit to perform an operation, and each layer can communicate with another layer by a memory interface. For example, a first layer can be performed by a first-fixed function engine in a DLA circuit that receives an input tensor, performs an operation on the input tensor to generate an output tensor, and stores the output tensor in system memory, such as dynamic random access memory (DRAM) coupled to the accelerator. A second fixed-function engine can perform a second layer that receives the output tensor from the first layer from memory as a second input tensor, performs an operation on the second input tensor to generate a second output tensor, and stores the second output tensor in DRAM. Each communication introduces a tensor read operation and a tensor write operation in the memory interface.

Accordingly, aspects of the present disclosure permit the cryptographic hardware to be shared among multiple users while supporting fairness between the users despite different transfer sizes. Aspects of the present disclosure does not require transfers to be split by software and encrypted separately ahead of time, which would produce multiple authentication tags for each of the splits. The aspects of the present disclosure supports Quality of Service (QoS) across multiple users sharing the same cryptographic hardware regardless of independent transfer sizes. Aspects of the present disclosure permit the cryptographic hardware to be shared among multiple data streams while supporting fairness between the streams despite different transfer sizes. The aspects of the present disclosure support QoS across multiple data streams sharing the same cryptographic hardware regardless of independent transfer sizes. In some cases, the QoS is guaranteed across the multiple data streams.

FIG. 1 is a block diagram of a computing system 100 with an accelerator circuit 102 including a copy engine 120 that supports fairness among multiple users of the accelerator circuit 102 or multiple data streams in a single application or belonging to a single user, in accordance with at least some embodiments. The computing system 100 is considered a headless system in which unit-by-unit management of an accelerator circuit 102 happens on a main system processor, CPU 104. The accelerator circuit 102 includes an interrupt interface 106, a configuration space bus (CSB) interface 108, a primary data bus interface 110 (data backbone interface (DBBIF)), a secondary data bus interface 112, and a copy engine (CE) 120, as described in more detail below. The CPU 104 and the accelerator circuit 102 are coupled to system memory 114 (e.g., DRAM). The accelerator circuit 102 is coupled to the system memory 114 via the primary data bus interface 110. The accelerator circuit 102 can be coupled to a secondary memory 116, such as video memory (DRAM and/or SRAM), via the secondary data bus interface 112. The CSB interface 108 can be a control channel interface that implements a register file (e.g., configuration registers) and an interrupt interface. In at least one embodiment, the CSB interface 108 is a synchronous, low-bandwidth, low-power, 32-bit control bus designed to be used by the CPU 104 to access configuration registers in the accelerator circuit 102. The interrupt interface can be a 1-bit level-driven interrupt. The interrupt line can be asserted when a task has been completed or when an error occurs.

The accelerator circuit 102 can also include a memory interface block that uses one or more bus interfaces to interface with memory. In at least one embodiment, the memory interface block uses the primary data bus interface 110 connecting to the system memory 114. The system memory 114 can include DRAM. The primary data bus interface 110 can be shared with the CPU and input/output (I/O) peripherals. In at least one embodiment, the primary data bus interface 110 is a data backbone (DBB) interface that connects the accelerator circuit 102 and other memory subsystems. The DBB interface is a configurable data bus that can specify different address sizes, different data sizes, and issue different sizes of requests. In at least one embodiment, the DBB interface uses an interface protocol, such as AXI (Advanced Extensible Interface) or other similar protocols. In at least one embodiment, the memory interface block uses the secondary data bus interface 112 to connect to secondary memory 116 dedicated to the accelerator circuit 102. The secondary memory 116 can include DRAM. The secondary memory 116 can be video memory. The accelerator circuit 102 can also include a memory interface that connects to higher-bandwidth memory dedicated to the accelerator circuit 102. This memory can be on-chip SRAM to provide higher throughput and lower access latency.

For example, during inference, a typical flow begins with a management processor (either a microcontroller or a CPU), coupled to accelerator circuit 102, sending a hardware layer configuration and an activate command. If data dependencies do not preclude this, multiple hardware layers can be sent to different engines and activated simultaneously (e.g., if there is another layer whose inputs do not depend on the previous layer's output). In at least one embodiment, every engine can have a double buffer for its configuration registers that allows a second layer's configuration to begin processing when the active layer has completed. Once a hardware engine finishes its active task, the accelerator circuit 102 can interrupt the management processor to report the completion, and the management processor can begin the process again. This kind of command-execute-interrupt flow repeats until inference on the entire network is complete. In at least one embodiment, an interrupt interface can signal completion of a copy. In another embodiment, a semaphore release (write to a flag typically in system memory that CPU thread is polling) can be used to let software know that the workload has finished.

The computing system 100 of FIG. 1 represents a more cost-sensitive system than a computing system with a dedicated controller or coprocessor for unit-by-unit management of the accelerator circuit 102. The computing system 100 can be considered a small system model. The small system model can be used for cost-sensitive connected Internet of Things (IoT) class devices, artificial intelligence (AI), and automation-oriented systems with well-defined tasks for which cost, area, and power are the primary drivers. Savings in terms of cost, area, and power can be achieved through configurable resources of the accelerator circuit 102. Neural network models can be pre-compiled and their performance can be optimized, allowing larger models to be reduced in the load complexity. In turn, the reduction in load complexity enables a scaled-down DLA implementation where models consume less storage and take less time for system software to load and process. In at least one embodiment, the computing system 100 can execute one task at a time. Alternatively, the computing system 100 can execute multiple tasks at a time. For computing system 100, context switches by computing system 100 do not result in the CPU 104 being overly burdened by servicing a large number of interrupts from the accelerator circuit 102. This removes the need for an additional microcontroller, and the CPU 104 performs memory allocation and other subsystem management operations. As described herein, the accelerator circuit 102 includes a copy engine 120 that supports fairness among multiple users of the accelerator circuit 102. As described herein, the accelerator circuit 102 includes a copy engine 120 that supports fairness among multiple data streams of the accelerator circuit 102. Additional details of the copy engine 120 are described below with respect to FIG. 2.

Figure 2:
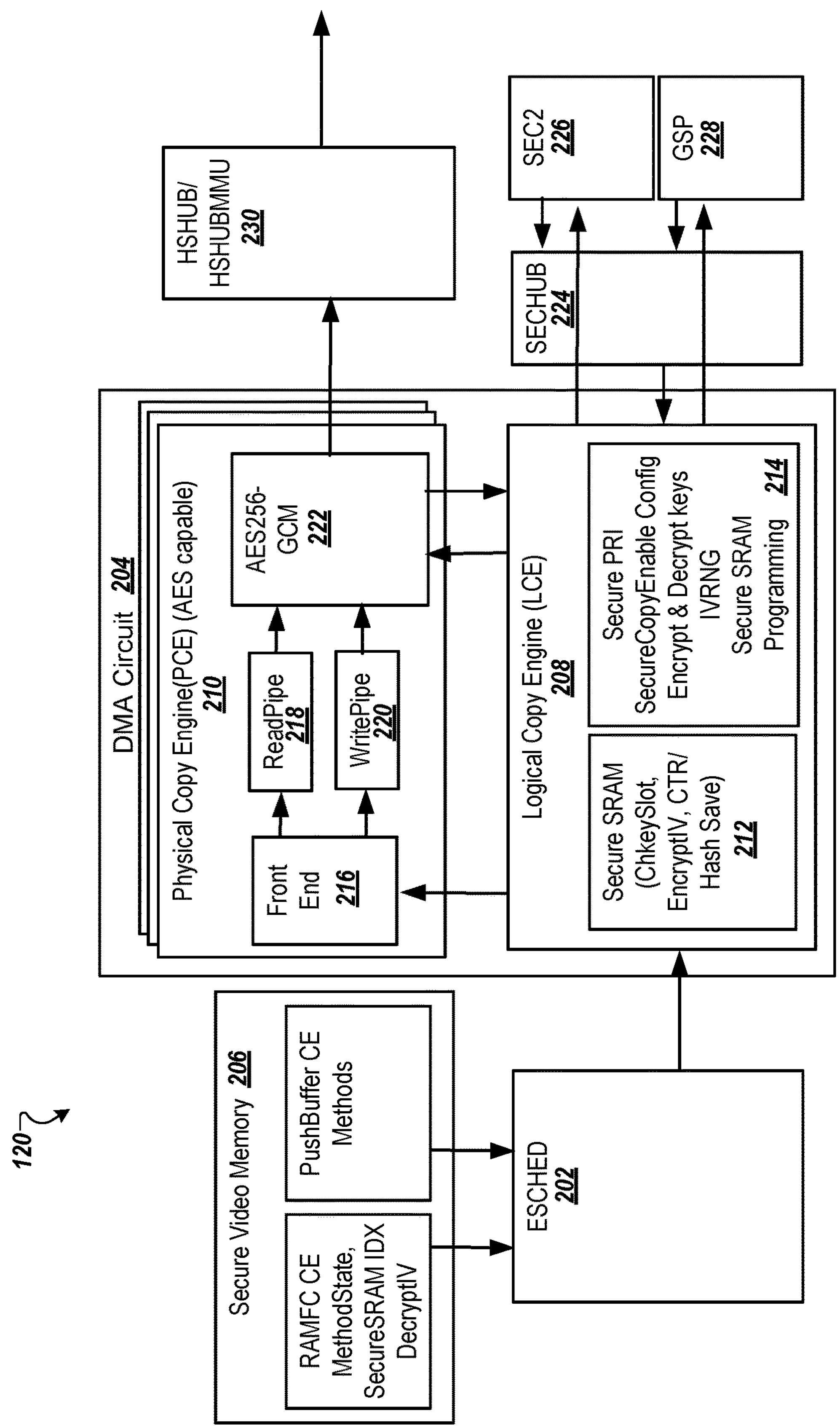
FIG. 2 is a block diagram of a copy engine of an accelerator circuit, in accordance with at least some embodiments.

FIG. 2 is a block diagram of a copy engine 120 of an accelerator circuit, in accordance with at least some embodiments. The copy engine 120 includes a hardware scheduler circuit 202 (labeled ESCHED for engine scheduler) and a direct memory access (DMA) circuit 204. The hardware scheduler circuit 202 is coupled to secondary memory 206 and the DMA circuit 204. The DMA circuit 204 is coupled to a memory management unit 230 (MMU) coupled to system memory (not illustrated in FIG. 2). The MMU 230 can provide routing functionality between system memory and the accelerator circuit. The MMU 230 can provide a path for all engines on the accelerator, including the copy engine 120, to access any location in memory (e.g., video memory, system memory, etc.). The MMU 230 can perform access checks to allow only permitted accesses across the interface. The MMU 230 can restrict and report illegal accesses. The DMA circuit 204 includes a cryptographic circuit that implements an authenticated encryption algorithm to encrypt retrieved data from the secure memory or decrypt received data to be stored in secure memory. In at least one embodiment, as illustrated in FIG. 2, the DMA circuit 204 includes a logical copy engine (LCE) 208 and a physical copy engine (PCE) 210. The DMA circuit 204 can include multiple PCEs that are coupled to the LCE 208. The LCE 208 can include a secure memory 212 that can store an encrypt IV, a block counter, and a HASH key per each channel key slot. Each channel key slot, which can be assigned to an application, can store context for the application in a specified slot in the secure memory 212. The LCE 208 can also include secure private interface 214 that receives configuration information, encrypt and decrypt keys, IV random number generator, secure SRAM programming, from a security hub or other security circuitry that manages private keys. In at least one embodiment, the encrypt and decrypt keys and IV are produced by a random number generator from a security processor on the GPU.

In at least one embodiment, as illustrated in FIG. 2, the PCE 210 includes front-end circuitry 216, a read pipeline 218, a write pipeline 220, and a cryptographic circuit 222 that provides secure data transfers for applications where confidentiality is required. In at least one embodiment, the cryptographic circuit 222 is an AES-GCM hardware engine that implements the AES256-GCM cipher. In at least one embodiment, the cryptographic circuit 222 is an AES-GCM circuit. Alternatively, the cryptographic circuit 222 can implement other sequential cryptographic algorithms in which the underlying cryptographic hardware is shared among multiple users (e.g., multiple applications in a time-sliced manner). For example the cryptographic hardware can be shared by multiple users in a cloud infrastructure. For another example, the cryptographic hardware can be used in a virtualized environment in which a hypervisor allows the underlying hardware to support multiple guest virtual machines (VMs) by virtually sharing its resources, including the accelerator circuit 100. In another embodiment, the DMA circuit 204 includes an LCE 208 and a first PCE 210, and a second PCE. The first PCE 210 is coupled to the LCE 208 and includes the cryptographic circuit 222, the first read pipeline 218, and the write pipeline 220. The second PCE is coupled to the LCE 208 and includes a second cryptographic circuit, a second read pipeline, a second write pipeline, and second front-end circuitry. In at least one embodiment, the second cryptographic circuit is a second AES-GCM circuit. Additional PCEs can each include front-end circuitry, a read pipeline, a write pipeline, and a cryptographic circuit.

In at least one embodiment, the copy engine 120 can encrypt data in connection with a data transfer. To encrypt the data transfer, a context is loaded (CTXT LOAD) on LCE 208 with a valid SRAM index that points to a slot in the secure memory 212 assigned to an application. The KEY indicated in the slot in the secure memory 212 is loaded on the cryptographic circuit 222 (AES hardware engine). A first IV that is used is SRAM.IV+1, which is the incremented IV saved in LCE 208. The PCE 210 generates memory requests (reads/writes). The PCE 210 reads data plaintext from a first region of memory (compute protected region (CPR)), and encrypts the data plaintext with the KEY and IV, and adds to the Authentication Tag (AT or AuthTag). During encryption operation, PCE 210 reads from protected memory (e.g., video memory), encrypts the data internally using the cryptographic circuit 222 and writes encrypted data into unprotected region (e.g., system memory or video memory). In at least one embodiment, the PCE 210 writes encrypted data to a second region of memory (non-compute protected region (NonCPR)). At the end of a copy (or a last copy split in a timeslice), the PCE 210 writes IV used to the second region of memory (NonCPR), and writes the computed authentication tag to the second region of memory (NonCPR). The requests can carry a region identifier when interacting with the MMU. The region identifier indicates where the memory region must be CPR or non-compute protected region (NonCPR). The copy engine 120 can interact with the MMU to get the address of each region. The region identifier is specified by the copy engine 120 when making a MMU translation request, since MMU tracks CPR and NonCPR attributes of memory regions. If the region identifier specified by the copy engine 120 does not match the attributes of the target memory location, MMU would prevent the access and return an error (e.g., MMU_NACK) to the copy engine 120. The CPR is a first region of memory that contains decrypted data. CPR can be a memory sandbox that is accessible to select clients only and is not accessible to any malicious actors. NonCPR is any region of memory outside of CPR. NonCPR is untrusted as it can be accessed by malicious actors. The copy engine 120 can ensure that data movement from NonCPR to CPR has to follow the decryption path, i.e., nonCPR is required to have encrypted data that only the copy engine 120 with the right key can understand. Likewise, the copy engine 120 can ensure that any data movement from CPR to NonCPR goes through the encryption path. Encrypted data in NonCPR is accessible to malicious actors but cannot be tampered with as the malicious actors do not have the cryptographic keys to understand the encrypted data. The copy engine 120 can write an authentication tag to NonCPR so the use can detect corruption from a malicious actor when it decrypts.

In at least one embodiment, the copy engine 120 can decrypt data in connection with a data transfer. To decrypt the data transfer, a context is loaded (CTX LOAD) on LCE 208 with a valid SRAM index that points to a slot in the secure memory 212 assigned to an application. The KEY indicated in the slot in the secure memory 212 is loaded on the cryptographic circuit 222 (AES hardware engine). A first IV that is used is IB.IV+1, which is the IV that is tracked and incremented in the hardware scheduler circuit 202 and passed to the LCE 208. The PCE 210 reads the expected authentication tag from memory, reads cipher data from the second region of memory (NonCPR), and decrypts the cipher data with KEY and IV, and adds to the authentication tag. During decryption operation, PCE 210 reads from unprotected memory (e.g., in system memory or video memory), decrypts the data internally using the cryptographic circuit 222 and writes decrypted data into protected region (e.g., CPR). In at least one embodiment, the PCE 210 writes plaintext data to the first region of memory (CPR). On a last copy split, the PCE 210 reads the authentication tag from the authentication tag address provided in the methods and compares the computed authentication tag with the provided authentication tag. If the values match, the operation is successful. If there is no match, the PCE 210 raises a fatal interrupt, no semaphore release occurs, and channel recovery is needed. Channel recovery (also known as Robust Channel recovery or RC recovery) is a mechanism used by the resource manager, or GPU PF driver, to mark all pending work on an engine as invalid by indicating an error in each of the work channels. The engine is subsequently reset. Channel errors are used by the resource manager (or GPU PF driver) to let a software layer (e.g., CUDA) know the work has not completed.

In at least one embodiment, the IV is 96 bits and contrasted from two components, including a 64-bit channel counter with a unique identifier per channel and a 32-bit message counter that starts from zero and is incremented per encrypt/decrypt start of channel (SOC). A 96-bit RNG mask is a per-key mask that is stored in Secure PRI. A copy IV (COPY_IV) is a RNG XOR [CHANNEL_CTR, ++MSG_CTR]. The copy engine will detect that an IV has exceeded the maximum number of copies via detecting if the MESSAG_CTR+1 value used in the COPY_IV construction is zero. The copy engine 120 keeps track of the encrypt IV used in each encrypt copy and performs pre-increment and save-restore from the SRAM. Encrypt IV is passed to the cryptographic circuit 222 post XOR with RNG in the decryptIV methods per copy. The IV that is saved in the SRAM is reflected based on copy completion. The copy engine 120 can have multiple encrypted copies visible to the PCE and maintains two counters, including the IV that should be sent on the net encrypt copy and the last copy completed. On a context save (CTXT_SAVE) the IV from the last copy that was completed is saved to SRAM. The IV for decryption is stored in the instance block and passed to the copy engine 120 during a decrypt copy via decrypt IV methods. The copy engine 120 can detect overflow and interrupt if MESSAGE_CTR=0. The copy engine 120 can XOR the decrypt IV with the correct RNG before passing from LCE to the front-end circuitry 216.

In at least one embodiment, the copy engine 120 includes a secure private interface 214. The secure private interface 214 is accessible by secure software to provide secure configuration or secret keys and query interrupt status for encryption and decryption. The copy engine 120 can connect to a secure hub 224 as a client, allowing a dedicated on-chip security processor (SEC2) 226 and a GPU System Processor (GSP) 228 to access these secure private interface 214, but does not allow BAR0 access. The GSP 228 can be used to offload GPU initialization and management tasks. The SEC2 226 manages encryption keys and other secure information used by the accelerator circuit 100.

In at least one embodiment, the secure memory 212 is a secure SRAM with N entries (e.g., 512 entries), each with a valid bit. Each entry has a lower and upper 128-bit component. The lower component can contain a first encrypt IV counter, a second encrypt IV counter, an IV channel identifier, one or more key indexes, preemption information, and a block counter. The higher component can contain a first partial authentication tag, a second partial authentication tag, a third partial authentication tag, and a fourth partial authentication tag. The secure SRAM can be programmed through the secure private interface 214 via registers. The SRAM can support read, write, and invalidate functionality. The SRAM index can be marked valid when the lower 128 bits of the 256-bit entry are programmed by SEC2 226/GSP 228. An attempt to read an invalid SRAM entry will return 0x0 in the data registers. On a fatal error, the state of the SRAM cannot be guaranteed to be valid. The copy engine 120 can automatically invalidate the SRAM index on a fatal error, so software reprograms the SRAM index.

During operation in at least one embodiment, the hardware scheduler circuit 202 receives a first descriptor of a first data transfer of a first size associated with a first application. The first size can represent a complete copy size of the first data transfer. The first descriptor specifies a first index in the secure memory 212 corresponding to the first application. The hardware scheduler circuit 202 splits the first data transfer into a first set of portions. Each portion should be less than or equal to the first size and is required to complete execution before a context switch to another application. For example, the portions can be 8 KB each. Alternatively, other sizes can be used. The portions can be chunks, partial transfers, or partial copies that collectively make up the complete copy of the first data transfer. The DMA circuit 204, during a first period, executes a first subset of the first set of portions sequentially using a first IV and a first encryption key associated with the first application. In at least one embodiment, the copy engine 120 executes each split portion (i.e., chunk) serially on the PCE 210 where upon completion.

At an end of the first period, DMA circuit 204 stores a first computed hash key and a first block counter in the secure memory 212 at the specified first index. In at least one embodiment, the copy engine 120 checkpoints the computed value of a partial HASH key and block counter in secure memory 212 at the loaded contexts corresponding index. The partial HASH key, also referred to as subhash key (H), is the intermediate value ultimately used to compute an authentication tag. For example, when a timeslice expires for the context, the secure memory 212 contains the current block counter and the partial HASH key computed from the point of the last split portion. The current block counter and the partial HASH key can be retained in the secure memory 212 for a subsequent timeslice to complete the transfer. The DMA circuit 204 can then be used for another application. During a second period subsequent to the first period, DMA circuit 204 executes a second subset of the first set of portions sequentially using the first computed hash key and the first block counter stored in the secure memory 212 at the specified first index. That is, when the original user's timeslice is reloaded after arbitrating amongst multiple users, the block counter and partial HASH key can be restored from the secure memory 212 to complete the execution of the partial copy. At the end of the second period, the DMA circuit 204 stores a first authentication tag associated with the first data transfer. This assumes that the first data transfer is completed during the second period. If the first data transfer is not completed during the second period, the DMA circuit 204 continues to execute the rest of the first set of portions in a subsequent period.

The hardware scheduler circuit 202 can receive a second descriptor of a second data transfer of a second size associated with a second application. The second descriptor specifies a second index in the secure memory 212 corresponding to the second application. The hardware scheduler circuit 202 splits the second data transfer into a second set of portions. Each portion should be less than or equal to the second size and is required to complete execution before a context switch to another application. During a third period, the DMA circuit 204 executes a first subset of the second set of portions sequentially using a second IV and a second encryption key associated with the second application. The DMA circuit 204 stores a second computed hash key and a second block counter in the secure memory 212 at the specified second index at the end of the third period. During a fourth period subsequent to the third period, the DMA circuit 204 executes a second subset of the second set of portions sequentially using the second computed hash key and the second block counter stored in the secure memory 212 at the specified second index. At the end of the fourth period, the DMA circuit 204 stores a second authentication tag associated with the second data transfer. This assumes that the second data transfer is completed during the fourth period. If the second data transfer is not completed during the second period, the DMA circuit 204 continues to execute the rest of the second set of portions in a subsequent period. In one embodiment, the first size and the second size are different. Because the sizes are different, the hardware scheduler circuit 202 can guarantee fairness across the first application and the second application for QoS requirements independent of the first and second sizes. Alternatively, the hardware scheduler circuit 202 can guarantee fairness across multiples data streams of a same application or belonging to a same user for QoS requirements independent of the first and second sizes.

In at least one embodiment, the first descriptor is an encryption descriptor. The LCE 208 retrieves the first IV from the secure memory 212 and the first encryption key from secure memory that stores key, such as over the secure private interface 214. The cryptographic circuit 222 generates a first block cipher using the first encryption key, the first IV, and a first value of the first block counter. The cryptographic circuit 222 generates a second block cipher using the first encryption key, the first IV, and a second value of the first block counter. The cryptographic circuit 222 generates a first portion of ciphertext using a first portion of plaintext and the second block cipher. The cryptographic circuit 222 computes a first value for the first computed hash key using the first portion of the ciphertext and a zero block (or a second nonce). The cryptographic circuit 222 generates a third block cipher using the first encryption key, the first IV, and a third value of the first block counter. The cryptographic circuit 222 generates a second portion of the ciphertext using a second portion of plaintext and the third block cipher. The cryptographic circuit 222 computes a second value for the first computed hash key using the second portion of the ciphertext and the first value for the first computed hash key. The cryptographic circuit 222 generates the first authentication tag using the first block cipher and a last value for the first computed hash key.

In at least one embodiment, the first descriptor is a decryption operation descriptor. The LCE 208 retrieves the first IV and the first decryption key. The cryptographic circuit 222 generates a first block cipher using the first encryption key, the first IV, and a first value of the first block counter. The cryptographic circuit 222 generates a second block cipher using the first encryption key, the first IV, and a second value of the first block counter. The cryptographic circuit 222 generates a first portion of plaintext using a first portion of ciphertext and the second block cipher. The cryptographic circuit 222 computes a first value for the first computed hash key using the first portion of the ciphertext, a zero block (or a second nonce), and the first portion of ciphertext. The cryptographic circuit 222 generates a third block cipher using the first encryption key, the first IV, and a third value of the first block counter. The cryptographic circuit 222 generates a second portion of plaintext using a second portion of ciphertext and the third block cipher. The cryptographic circuit 222 computes a second value for the first computed hash key using the second portion of the ciphertext and the first value for the first computed hash key. The cryptographic circuit 222 generates the first authentication tag using the first block cipher and a last value for the first computed hash key.

Figure 3:
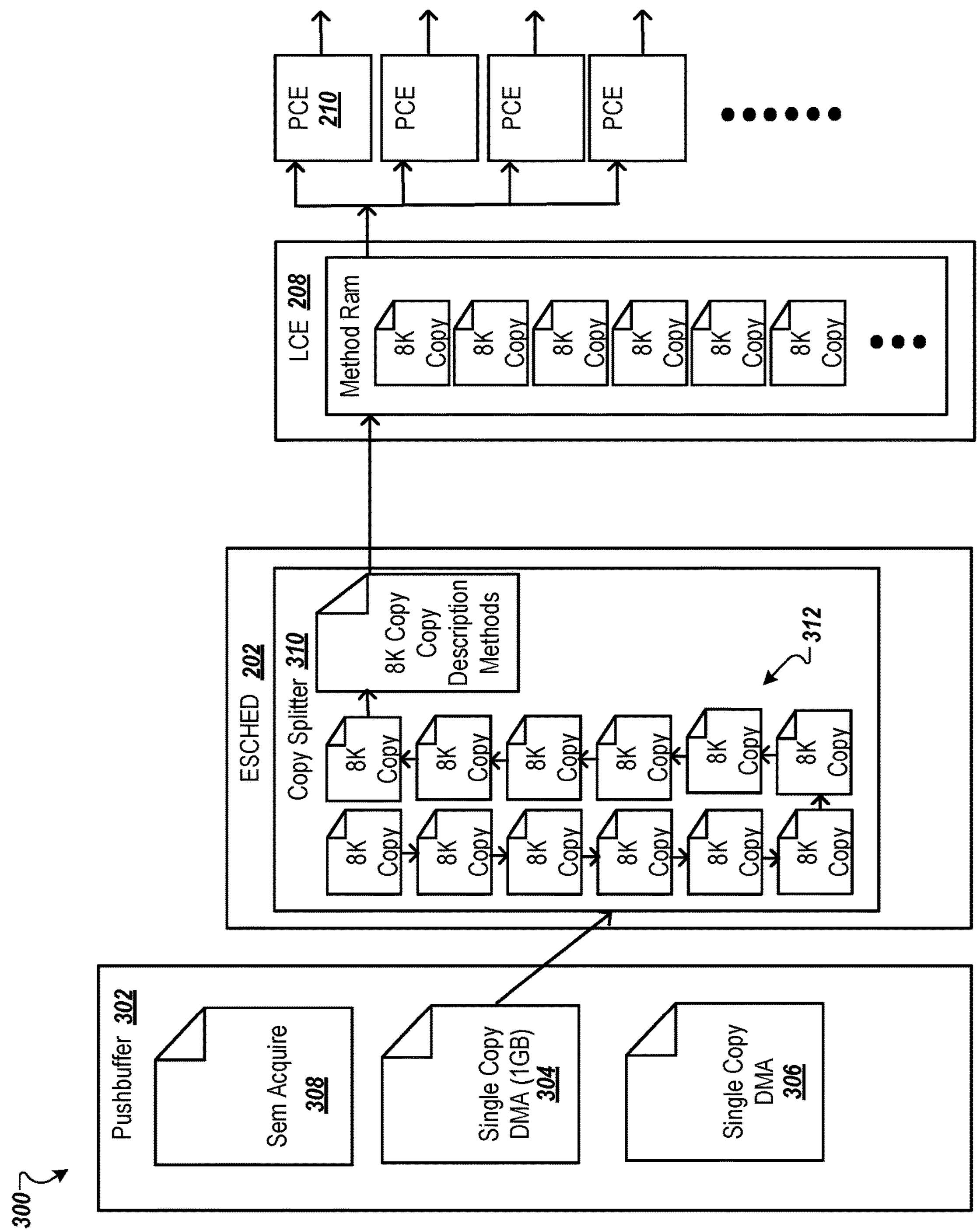
FIG. 3 is a functional diagram of a flow of scheduling a single data transfer to be performed by a DMA circuit, in accordance with at least some embodiments.

FIG. 3 is a functional diagram of a flow 300 of scheduling a single data transfer performed by a DMA circuit, in accordance with at least some embodiments. A pushbuffer 302, assigned to an application, is stored in secondary memory 206 (not illustrated in FIG. 3). The pushbuffer 302 can include multiple data transfers 304, 306 (also referred to as single copy DMA) and a semaphore acquire mechanism 308. A pushbuffer contains specifications of the operations that a GPU context is to perform for a particular client. The pushbuffers are stored in memory. The software can put the semaphore acquire mechanism 308 at the end of the pushbuffer 302 and have an engine release the semaphore. The pushbuffer 302 can also store an index assigned to where the IV, KEY, and partial authentication tags are stored in secure memory 212 during encryption or decryption.

During a timeslice for the application, the hardware scheduler circuit 202 (ESCHED) receives a first application descriptor for a first data transfer 304 from the pushbuffer 302. The hardware scheduler circuit 202 includes a copy splitter 310 that splits the first data transfer 304 (single copy DMA) into a set of partial transfers 312. Each partial transfer 312 has a fixed size (e.g., 8 KB) that is less than the size of the first data transfer (e.g., 1 GB). Each partial transfer 312 has a requirement to be completed before a context switch to another application once started. Each partial transfer 312 (e.g., 8 KB copy) contains a binary descriptor represented by one or more methods. The LCE 208 receives the partial transfers 312 from the hardware scheduler circuit 202, and the LCE 208 schedules a subset of the partial transfers 312 to be executed on the PCE 210 during a timeslice. In some cases, the hardware scheduler circuit 202 only sends the subset of the partial transfers 312 to the LCE 208 to be executed during the timeslice. The PCE 210 sequentially executes the subset of partial transfers 312 using the first context until a timeslice timeout occurs for the application. The PCE 210, in response to the timeslice timeout, stores a current value for the first hash key and a current value for the first block counter in the secure memory computed from a last partial transfer completed before the timeslice timeout. It should be noted that FIG. 3 only shows the data transfers of a single application. The hardware scheduler circuit 202 can receive data transfers from other pushbuffers corresponding to other applications, such as illustrated in FIG. 4.

Figure 4:
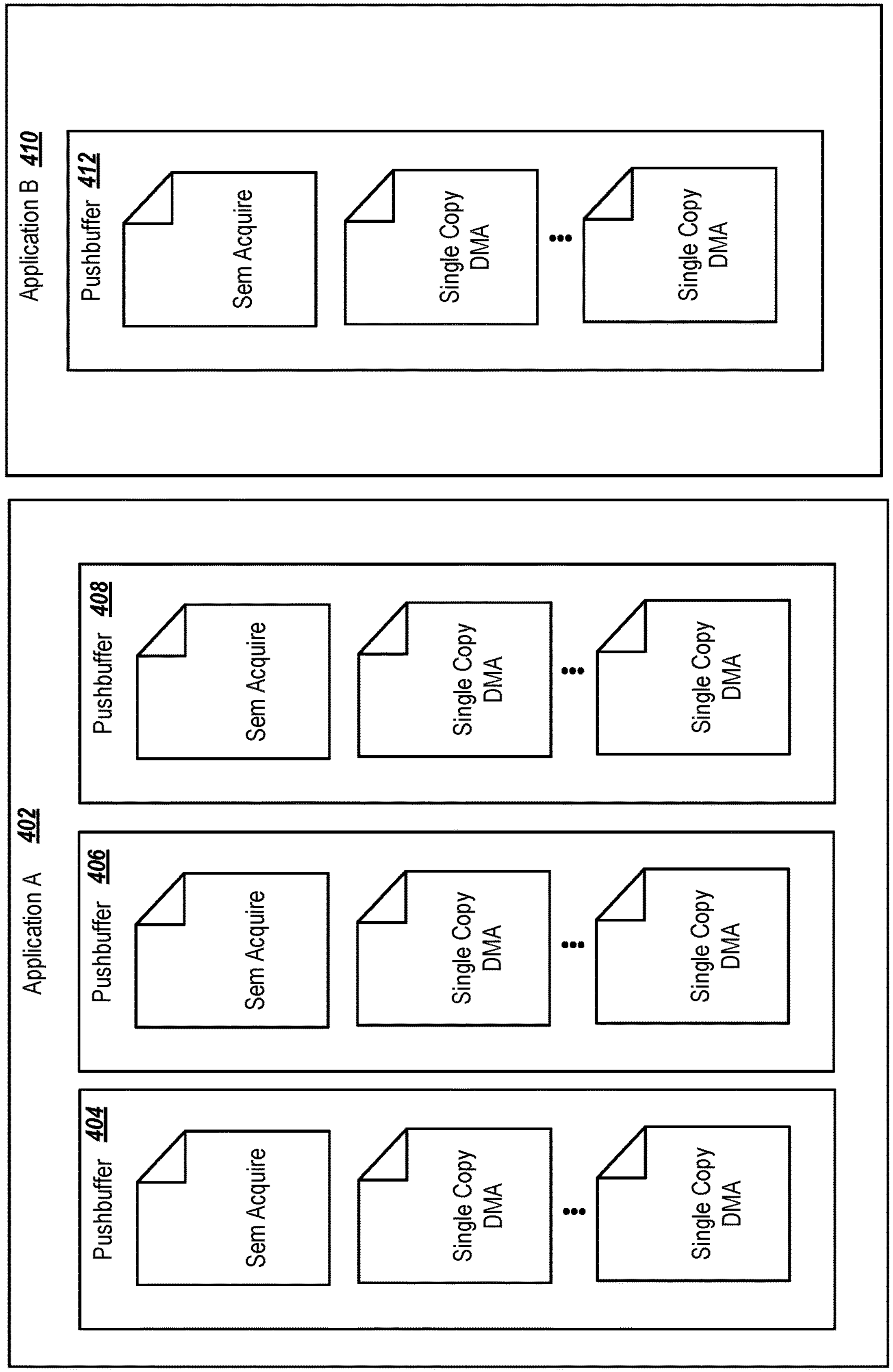
FIG. 4 illustrates a first application with multiple pushbuffers and a second application with a single pushbuffer, in accordance with at least some embodiments.

FIG. 4 illustrates a first application with multiple pushbuffers and a second application with a single pushbuffer, in accordance with at least some embodiments. A first application 402 can be assigned multiple pushbuffers 404, 406, 408. The pushbuffers 404, 406, 408 can be stored in the secondary memory 206 (not illustrated in FIG. 4). Each of the pushbuffers 404, 406, 408 can include multiple data transfers (also referred to as single copy DMA) and a semaphore acquire mechanism. A second application 410 can be assigned a pushbuffer 412. The pushbuffer 412 can be stored in the secondary memory 206 (not illustrated in FIG. 4). The pushbuffer 412 can include multiple data transfers and a semaphore acquire mechanism.

In at least one embodiment, a DMA buffer can store a first pushbuffer 404 for a first application 402 and a second pushbuffer 412 for a second application 410. The first pushbuffer 404 stores specifications of operations to be performed for the first application 402 and a first index where the first IV, first block counter, and first encryption key identifier are stored in secure memory 212. The second pushbuffer 412 stores specifications of operations to be performed for the second application 410 and the second index where the second IV, second block counter, and second encryption key identifier are stored in secure memory 212. In a further embodiment, a third pushbuffer 406 for the second application 410 is stored in the DMA buffer. Each of the first pushbuffer 404, second pushbuffer 412, and third pushbuffer 406 stores a semaphore acquire at the end of the respective pushbuffer to be released by the DMA circuit.

Figure 5A:
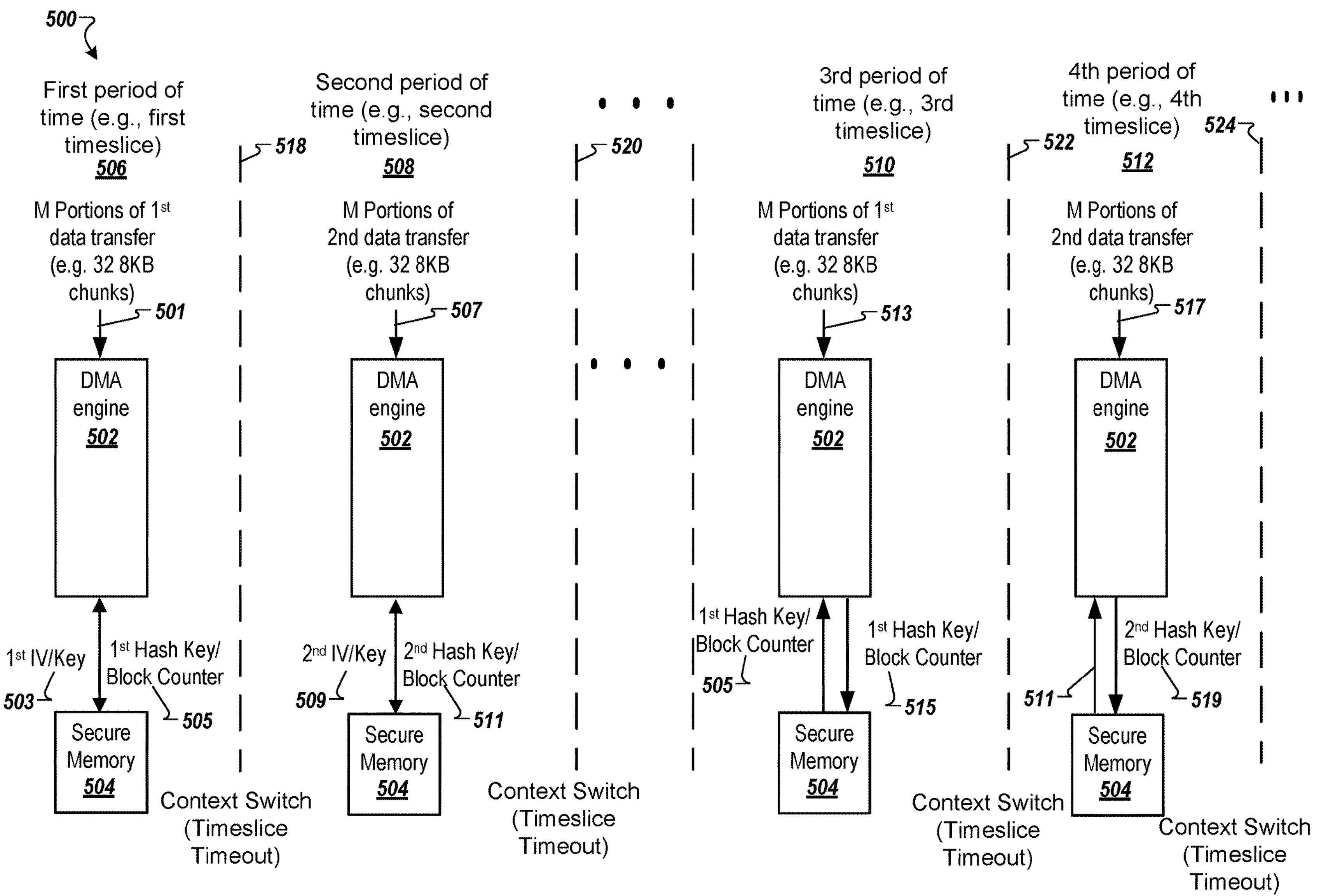
FIGS. 5A-5B illustrates a process flow of a DMA engine during multiple timeslices, in accordance with at least some embodiments.
Figure 5B:
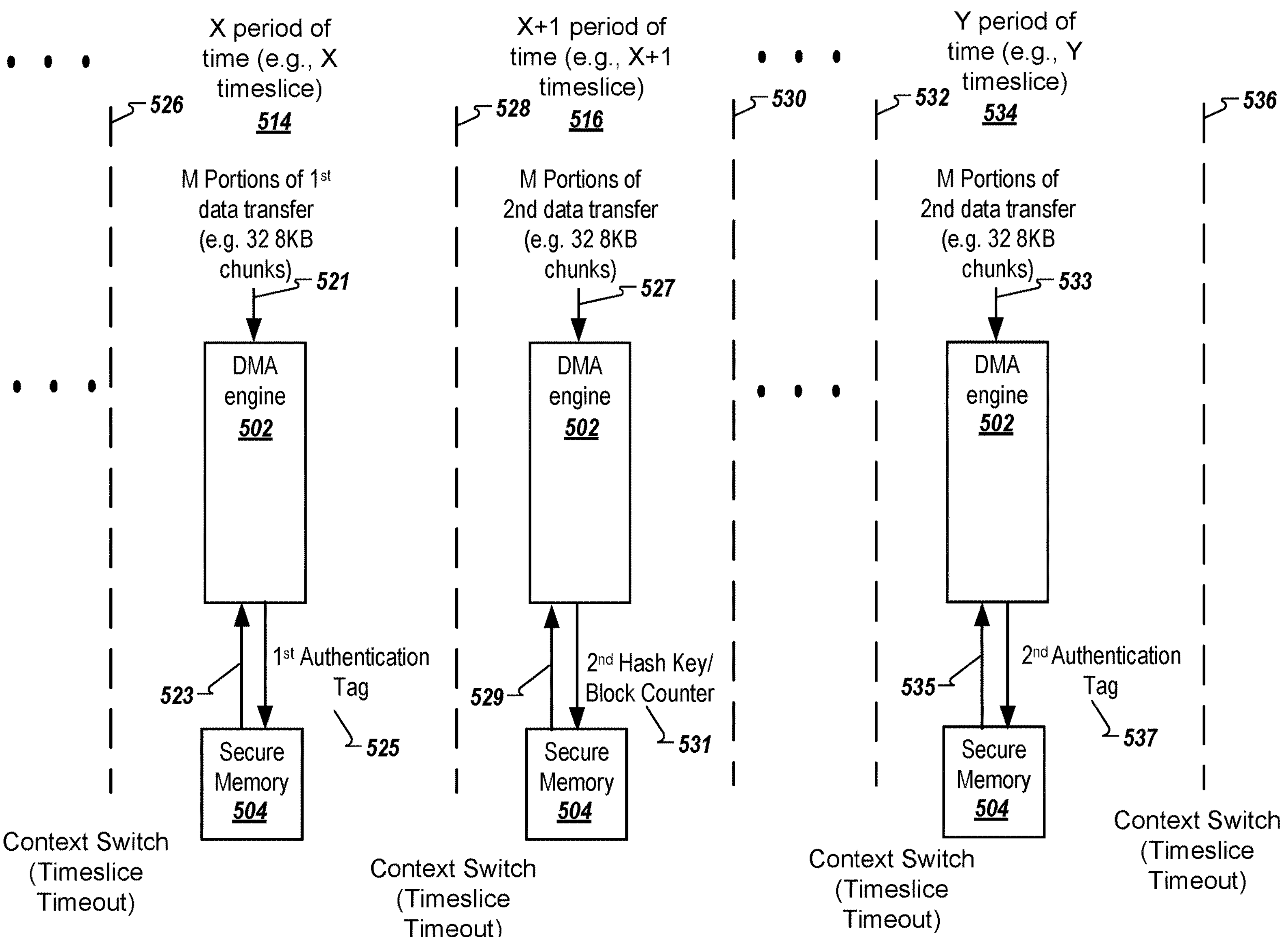

FIGS. 5A-5B illustrates a process flow 500 of a DMA engine 502 during multiple timeslices, in accordance with at least some embodiments. As illustrated in FIG. 5A, during a first period of time 506 (e.g., a first timeslice), first M portions 501 of a first data transfer are received by the DMA engine 502. The DMA engine 502 executes the first M portions 501 of the first data transfer using a first IV/KEY 503. The first IV/KEY 503 can be loaded from secure memory 504. The DMA engine 502 executes the first M portions 501 until a context switch 518. At the context switch 518, the DMA engine 502 stores a current value for the first hash key and a current value for the first block counter 505 in the secure memory 504 computed from a last partial transfer completed before the timeslice timeout (e.g., context switch 518). The context switch 518 can occur when a timeslice timeout occurs. The first timeslice can be the first period of time 506 assigned to the first application for access to the DMA engine 502. A second timeslice can be a second period of time 508 assigned to a second application.

As illustrated in FIG. 5A, during a second period of time 508 (e.g., a second timeslice), first M portions 507 of a second data transfer are received by the DMA engine 502. The DMA engine 502 executes the first M portions 507 of the second data transfer using a second IV/KEY 509. The second IV/KEY 509 can be loaded from secure memory 504. The DMA engine 502 executes the first M portions 407 until a context switch 520 occurs. At the context switch 520, the DMA engine 502 stores a current value for the second hash key and a current value for the second block counter 511 in the secure memory 504 computed from a last partial transfer completed before the timeslice timeout (e.g., context switch 520). The context switch 520 can occur when a timeslice timeout occurs. The process flow 500 can perform similar operations during additional periods for additional applications, if any.

As illustrated in FIG. 5A, during a third period of time 510 (e.g., a third timeslice), second M portions 513 of the first data transfer are received by the DMA engine 502. The DMA engine 502 retrieves the current value current value for the first hash key and a current value for the first block counter 505 in the secure memory 504 computed from a last partial transfer completed before the timeslice timeout (e.g., context switch 518). The DMA engine 502 executes the second M portions 513 of the first data transfer using the first IV/KEY 503 and the current values for the first hash key and the first block counter 505 retrieved from secure memory 504. The DMA engine 502 executes the second M portions 513 until a context switch 522 occurs. At the context switch 522, the DMA engine 502 stores a current value for the first hash key and a current value for the first block counter 515 in the secure memory 504 computed from a last partial transfer completed before the timeslice timeout (e.g., context switch 522).

As illustrated in FIG. 5A, during a fourth period of time 512 (e.g., a fourth timeslice), second M portions 517 of the second data transfer are received by the DMA engine 502. The DMA engine 502 retrieves the current value current value for the second hash key and a current value for the second block counter 511 in the secure memory 504 computed from a last partial transfer completed before the timeslice timeout (e.g., context switch 520). The DMA engine 502 executes the second M portions 517 of the second data transfer using the second IV/KEY 509 and the current values for the second hash key and the second block counter 511 retrieved from secure memory 504. The DMA engine 502 executes the second M portions 517 until a context switch 524 occurs. At the context switch 524, the DMA engine 502 stores a current value for the second hash key and a current value for the second block counter 519 in the secure memory 504 computed from a last partial transfer completed before the timeslice timeout (e.g., context switch 522). The process flow 500 can perform similar operations during additional periods for additional applications, if any.

As illustrated in FIG. 5B, during an X period of time 514 (e.g., an Xth timeslice), last M portions 521 (or less than M portions) of the first data transfer are received by the DMA engine 502. The DMA engine 502 retrieves the current value current value for the first hash key and the current value for the first block counter 523 in the secure memory 504 computed from a last partial transfer completed before the last timeslice timeout. The DMA engine 502 executes the last M portions 521 of the first data transfer using the first IV/KEY 503 and the current values for the first hash key and the first block counter 523 retrieved from secure memory 504. The DMA engine 502 executes the last M portions 521 until a context switch 528 occurs. At the context switch 528, the DMA engine 502 computes and stores a first authentication tag 525 in the secure memory 504. At this point, the first data transfer is completed.

As illustrated in FIG. 5B, during an X+1 period of time 516 (e.g., an X+1 timeslice), additional M portions 527 of the second data transfer are received by the DMA engine 502. The DMA engine 502 retrieves the current value current value for the second hash key and a current value for the second block counter 529 in the secure memory 504 computed from a last partial transfer completed before the last timeslice timeout. The DMA engine 502 executes the additional M portions 527 of the second data transfer using the second IV/KEY 509 and the current values for the second hash key and the second block counter 529 retrieved from secure memory 504. The DMA engine 502 executes the additional M portions 527 until a context switch 530. At the context switch 530, the DMA engine 502 stores a current value for the second hash key and a current value for the second block counter 531 in the secure memory 504 computed from a last partial transfer completed before the timeslice timeout (e.g., context switch 530). The process flow 500 can perform similar operations during additional periods for additional applications, if any. It should be noted that the first data transfer for the first application is completed, but the second data transfer for the second application has not been completed.

As illustrated in FIG. 5B, during a Y period of time 534 (e.g., a Y timeslice), last M portions 533 (or less than M portions) of the second data transfer are received by the DMA engine 502. The DMA engine 502 retrieves the current value current value for the second hash key and a current value for the second block counter 535 in the secure memory 504 computed from a last partial transfer completed before the last timeslice timeout. The DMA engine 502 executes the last M portions 533 of the second data transfer using the second IV/KEY 509 and the current values for the second hash key and the second block counter 535 retrieved from secure memory 504. The DMA engine 502 executes the last M portions 533 until a context switch 536 or when the portions have been completed. At the context switch 536 or upon completion of the portions, the DMA engine 502 computes and stores a second authentication tag 537. At this point, the second data transfer is completed. It should be noted that FIGS. 5A-5B show that two applications can share the DMA engine 502 in a time-sliced manner with fairness between context switches. Alternatively, the DMA engine 502 can be shared by multiple data streams in a time-sliced manner with fairness between context switches.

Figure 6:
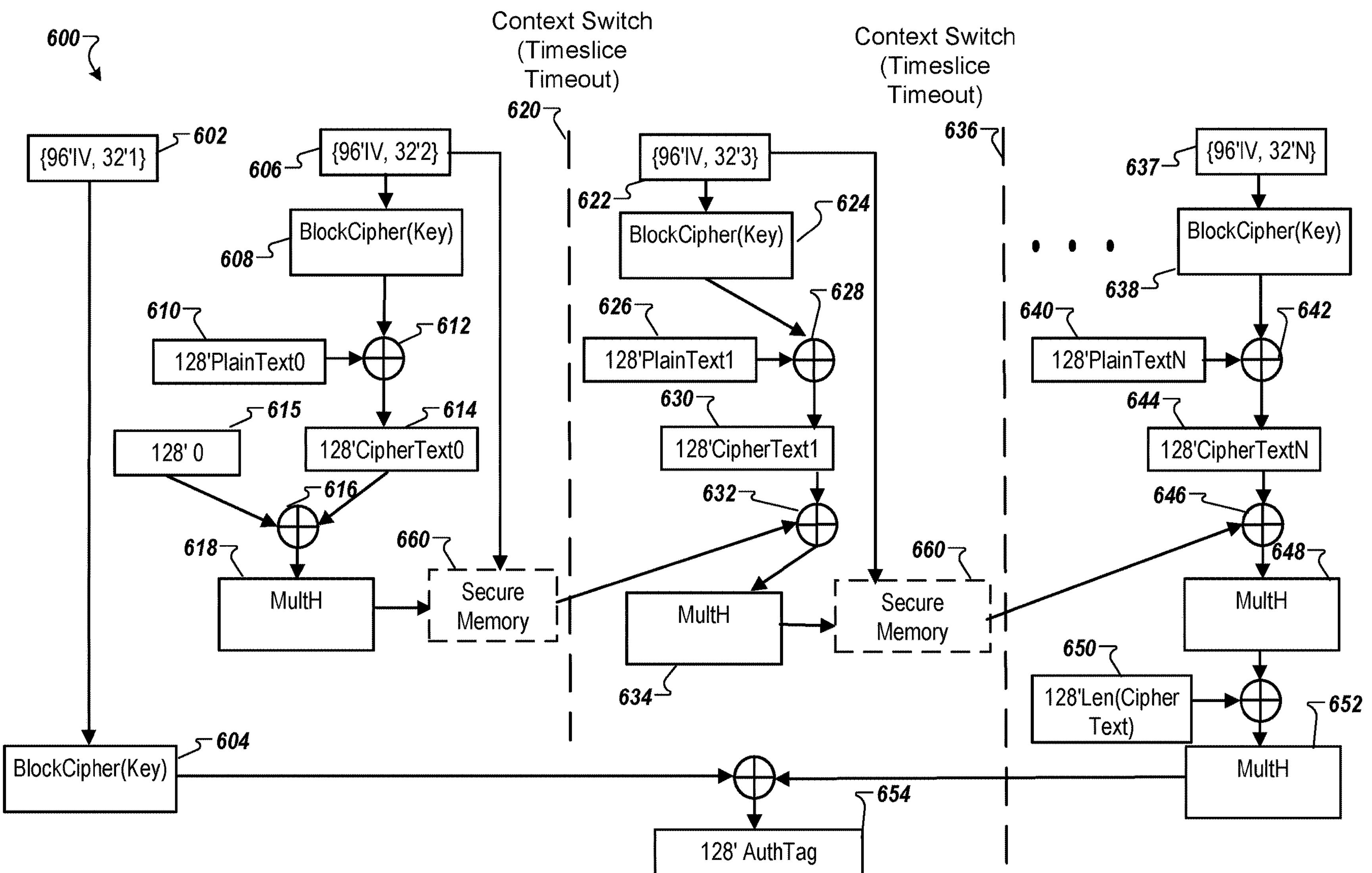
FIG. 6 is a flow diagram of an encryption operation used for a partial transfer, in accordance with at least some embodiments.

FIG. 6 is a flow diagram of an encryption operation 600 used for a partial transfer, in accordance with at least some embodiments. The encryption operation 600 is a simplified AES-GCM operation that shows a context switch before the full data transfer is completed. For AES-GCM, blocks are numbered sequentially using a block counter (32'1). The value of the block counter is combined with a first IV (96'IV) (block 602) and encrypted with an AES block cipher to obtain a first result (block 604). In particular, the first IV and a first value of the first block counter are encrypted with a first block cipher using the first encryption key to obtain the first result. The block counter is incremented (32'2) with the IV (96'IV) (block 606) and encrypted with an AES block cipher to obtain a second result (block 608). In particular, the first IV and a second value of the first block counter are encrypted with a second block cipher using the first encryption key to obtain a second result. The second result and first plaintext 610 are combined (e.g., XOR'd) (block 612) to obtain first ciphertext 614. The first ciphertext 614 is combined with a zero block 615 at block 616 to obtain a first value 618 for the first computed hash key. The first value 618 is a partial authentication tag for the first data transfer. The first value 618 can be stored in secure memory 660 before a context switch 620. If the context switch does not occur at this point, the encryption operation 600 continues. It should be noted that the fairness scheme can be applied to other values of IVs and counters, such as 64-bit IVs, or the like.

The block counter is incremented (32'3) with the IV (96'IV) (block 622) and encrypted with an AES block cipher to obtain a third result (block 624). In particular, the first IV and a third value of the first block counter are encrypted with a second block cipher using the first encryption key to obtain a third result. The third result and second plaintext 626 are combined (e.g., XOR'd) (block 628) to obtain second ciphertext 630. The second ciphertext 630 is combined (block 632) with the first value 618 for the first computed hash key stored in secure memory 660 to obtain a second value 634 for the first computed hash key. The second value 634 is a partial authentication tag for the first data transfer. The second value 634 can be stored in secure memory 660 before a context switch 636. If the context switch does not occur at this point, the encryption operation 600 continues.

At the end of the data transfer, the block counter is incremented (32'N) with the IV (96'IV) (block 637) and encrypted with an AES block cipher to obtain a fourth result (block 638). In particular, the first IV and an nth value of the first block counter are encrypted with an Nth block cipher using the first encryption key to obtain the fourth result. The fourth result and Nth plaintext 640 are combined (e.g., XOR'd) (block 642) to obtain Nth ciphertext 644. The Nth ciphertext 644 is combined (block 646) with an Nth value for the first computed hash key stored in secure memory 660 to obtain an Nth value 648 for the first computed hash key. Since this is the last block of the data transfer, the Nth value 648 is combined with a length of the ciphertext to obtain a fifth result 652. The fifth result 652 is combined with the first result from block 604 to obtain a first authentication tag 654.

Figure 7:
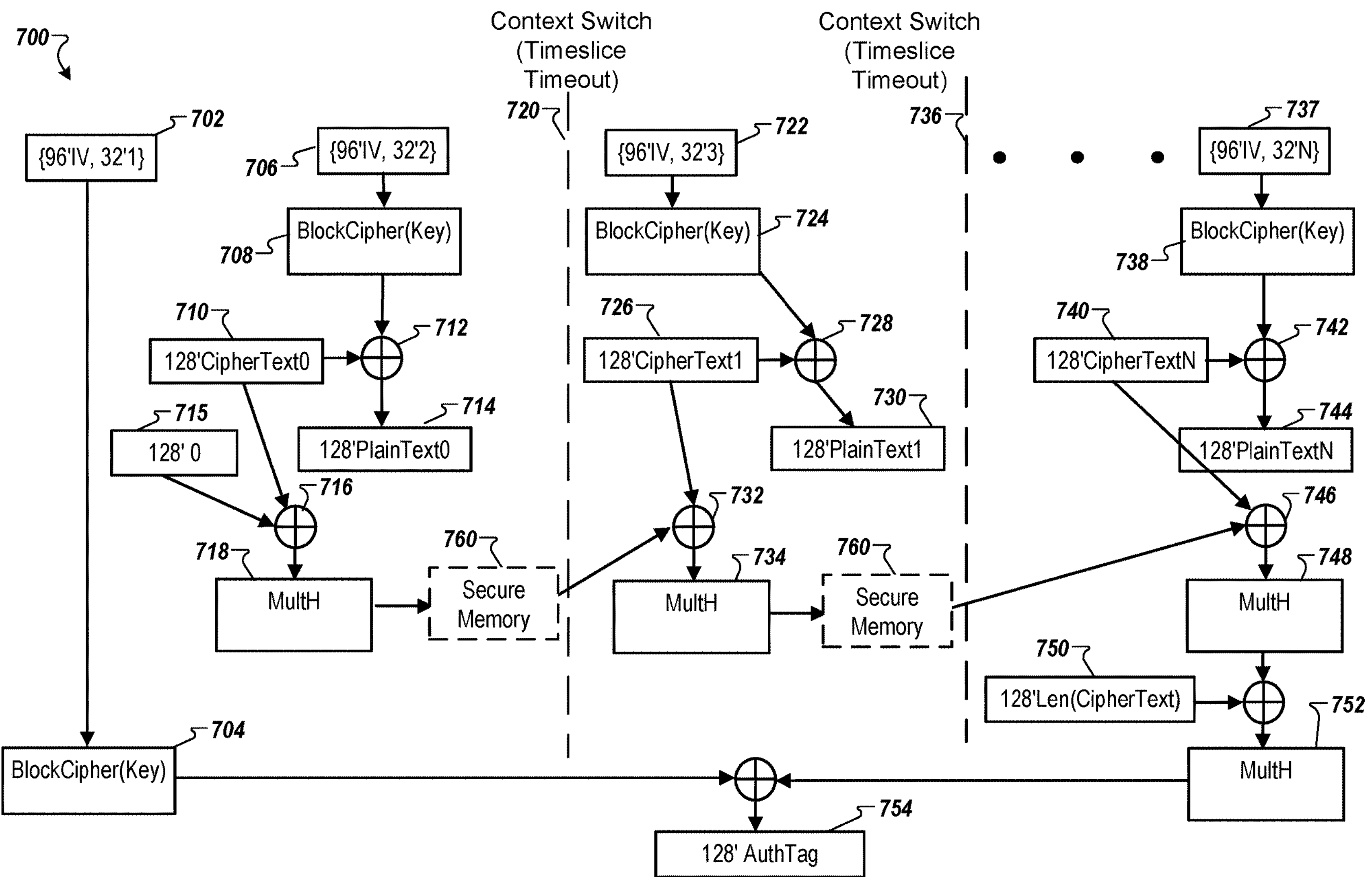
FIG. 7 is a flow diagram of a decryption operation used for a partial transfer, in accordance with at least some embodiments.

FIG. 7 is a flow diagram of a decryption operation 700 used for a partial transfer, in accordance with at least some embodiments. The decryption operation 700 is a simplified AES-GCM operation that shows a context switch before the full data transfer is completed. For AES-GCM, blocks are numbered sequentially using a block counter (32'1). The value of the block counter is combined with a first IV (96'IV) (block 702) and encrypted with an AES block cipher to obtain a first result (block 704). In particular, the first IV and a first value of the first block counter are encrypted with a first block cipher using the first encryption key to obtain the first result. The block counter is incremented (32'2) with the IV (96'IV) (block 706) and encrypted with an AES block cipher to obtain a second result (block 708). In particular, the first IV and a second value of the first block counter are encrypted with a second block cipher using the first encryption key to obtain a second result. The second result and first ciphertext 710 are combined (e.g., XOR'd) (block 612) to obtain first plaintext 714. The first ciphertext 710 and a zero block 715 are combined at block 716 to obtain a first value 718 for the first computed hash key. The first value 718 is a partial authentication tag for the first data transfer. The first value 718 can be stored in secure memory 760 before a context switch 720 occurs. If the context switch does not occur at this point, the encryption operation 700 continues.

The block counter is incremented (32'3) with the IV (96'IV) (block 722) and encrypted with an AES block cipher to obtain a third result (block 724). In particular, the first IV and a third value of the first block counter are encrypted with a second block cipher using the first encryption key to obtain a third result. The third result and second ciphertext 726 are combined (e.g., XOR'd) (block 728) to obtain second plaintext 730. The second ciphertext 726 is combined (block 732) with the first value 718 for the first computed hash key, stored in secure memory 760, to obtain a second value 734 for the first computed hash key. The second value 734 is a partial authentication tag for the first data transfer. The second value 734 can be stored in secure memory 760 before a context switch 736. If the context switch does not occur at this point, the encryption operation 600 continues.

At the end of the data transfer, the block counter is incremented (32'N) with the IV (96'IV) (block 737) and encrypted with an AES block cipher to obtain a fourth result (block 738). In particular, the first IV and an nth value of the first block counter are encrypted with an Nth block cipher using the first encryption key to obtain the fourth result. The fourth result and Nth ciphertext 740 are combined (e.g., XOR'd) (block 742) to obtain Nth plaintext 744. The Nth ciphertext 740 is combined (block 746) with an Nth value for the first computed hash key stored in secure memory 760 to obtain an Nth value 748 for the first computed hash key. Since this is the last block of the data transfer, the Nth value 748 is combined with a ciphertext length to obtain a fifth result 752. The fifth result 752 is combined with the first result from block 704 to obtain a first authentication tag 754. This authentication tag can be compared against an expected authentication tag. If a match occurs, the operation is successful. If there is no match, then an error is detected as described herein.

Figure 8:
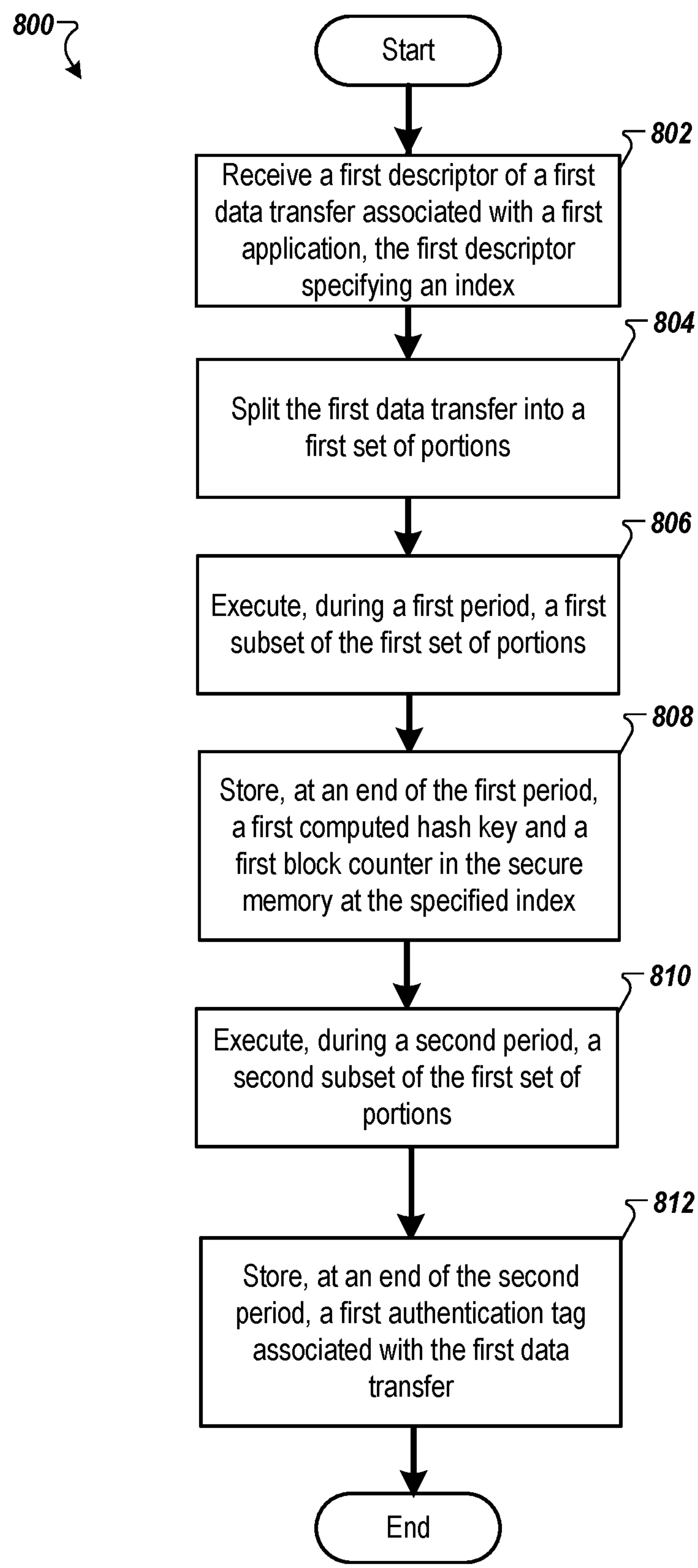
FIG. 8 is a flow diagram of a method of scheduling partial transfers to support fairness among multiple applications, in accordance with at least some embodiments.

FIG. 8 is a flow diagram of a method 800 of scheduling partial transfers to support fairness among multiple applications, in accordance with at least some embodiments. Method 800 can be performed by processing logic comprising hardware, software, firmware, or any combination thereof. In at least one embodiment, the method 800 is performed by the accelerator circuit 102 of FIG. 1. In at least one embodiment, the method 800 is performed by the copy engine 120 of FIG. 1. In at least one embodiment, the method 800 is performed by hardware scheduler circuit 202 of FIG. 2. In at least one embodiment, the method 800 is performed by hardware scheduler circuit 202 and the DMA circuit 204 of FIG. 2.

Referring to FIG. 8, the method 800 begins by processing logic receiving a first descriptor of a first data transfer of a first size associated with a first application (block 802). The first descriptor specifies a first index in secure memory corresponding to the first application. The processing logic splits the first data transfer into a first set of portions (block 804). Each portion has a size that is less than the first size, and a portion has to be completed before a context switch to another application, but not all portions have to be completed before the context switch. During a first period, the processing logic executes a first subset of the first set of portions sequentially using an authenticated encryption algorithm with a first IV and a first encryption key associated with the first application (block 806). At the end of the first period, the processing logic stores a first computed hash key and a first block counter in the secure memory at the specified first index (block 808). During a second period subsequent to the first period, the processing logic executes a second subset of the first set of portions sequentially using the first computed hash key and the first block counter stored in the secure memory at the specified first index (block 810). At the end of the second period, the processing logic stores a first authentication tag associated with the first data transfer (block 812), and the method 800 ends.

In a further embodiment, the processing logic receives a second descriptor of a second data transfer of a second size associated with a second application. The second descriptor specifies a second index in the secure memory corresponding to the second application. The processing logic splits the second data transfer into a second set of portions. Each portion is less than the second size and is required to complete execution before a context switch to another application. During a third period, the processing logic executes a first subset of the second set of portions sequentially using a second IV and a second encryption key associated with the second application. At the end of the third period, the processing logic stores a second computed hash key and a second block counter in the secure memory at the specified second index. During a fourth period subsequent to the third period, the processing logic executes a second subset of the second set of portions sequentially using the second computed hash key and the second block counter stored in the secure memory at the specified second index. At the end of the fourth period, the processing logic stores a second authentication tag associated with the second data transfer.

In one embodiment, the first descriptor is an encryption operation descriptor. In this embodiment, the processing logic retrieves the first IV and the first encryption key from the secure memory. The processing logic encrypts the first IV and a first value of the first block counter with a first block cipher using the first encryption key to obtain a first result. The processing logic encrypts the first IV and a second value of the first block counter with a second block cipher using the first encryption key to obtain a second result. The processing logic combines the second result and first plaintext to obtain first ciphertext. The processing logic combines the first ciphertext with a zero block to obtain a first value for the first computed hash key. The first value is a partial authentication tag for the first data transfer. At the second period, the processing logic retrieves the first IV, a current value of the first block counter, and a current value of the first computed hash key. The processing logic encrypts the first IV and the current value of the first block counter with a third block cipher using the first encryption key to obtain a third result. The processing logic combines the third result and second plaintext to obtain second ciphertext. The processing logic combines the second ciphertext and the current value of the first computed hash key to obtain a fourth result. The processing logic combines the fourth result with a length of ciphertext to obtain a fifth result. The processing logic combines the fifth result with the first result to obtain a first authentication tag.

In another embodiment, the first descriptor is a decryption operation descriptor. In this embodiment, the processing logic retrieves the first IV and the first encryption key from the secure memory. The processing logic encrypts the first IV and a first value of the first block counter with a first block cipher using the first encryption key to obtain a first result. The processing logic encrypts the first IV and a second value of the first block counter with a second block cipher using the first encryption key to obtain a second result. The processing logic combines the second result and first ciphertext to obtain first plaintext. The processing logic combines the first ciphertext, the first plaintext, a zero block to obtain a first value for the first computed hash key. The first value is a partial authentication tag for the first data transfer. The processing logic retrieves, during the second period, the first IV, a current value of the first block counter, and a current value of the first computed hash key. The processing logic encrypts the first IV and the current value of the first block counter with a third block cipher using the first encryption key to obtain a third result. The processing logic combines the third result and second ciphertext to obtain second plaintext. The processing logic combines the second plaintext and the current value of the first computed hash key to obtain a fourth result. The processing logic combines the fourth result with a length of ciphertext to obtain a fifth result. The processing logic combines the fifth result with the first result to obtain a first authentication tag.

In another embodiment, the processing logic receives a first descriptor of a first data transfer of a first size associated with a first data stream, the first descriptor specifying a first index in secure memory corresponding to the first data stream. The processing logic splits the first data transfer into a first set of portions. Each portion has a size that is less than the first size and a portion has to be completed before a context switch to another data stream, but not all portions have to be completed before the context switch. During a first period, the processing logic executes a first subset of the first set of portions sequentially using an authenticated encryption algorithm with a first IV and a first encryption key associated with the first data stream. At the end of the first period, the processing logic stores a first computed hash key and a first block counter in the secure memory at the specified first index. During a second period subsequent to the first period, the processing logic executes a second subset of the first set of portions sequentially using the first computed hash key and the first block counter stored in the secure memory at the specified first index. At the end of the second period, the processing logic stores a first authentication tag associated with the first data transfer.

In a further embodiment, the processing logic receives a second descriptor of a second data transfer of a second size associated with a second data stream. The second descriptor specifies a second index in the secure memory corresponding to the second data stream. The processing logic splits the second data transfer into a second set of portions. Each portion is less than the second size and is required to complete execution before a context switch to another data stream. During a third period, the processing logic executes a first subset of the second set of portions sequentially using a second IV and a second encryption key associated with the second data stream. At the end of the third period, the processing logic stores a second computed hash key and a second block counter in the secure memory at the specified second index. During a fourth period subsequent to the third period, the processing logic executes a second subset of the second set of portions sequentially using the second computed hash key and the second block counter stored in the secure memory at the specified second index. At the end of the fourth period, the processing logic stores a second authentication tag associated with the second data transfer.

Figure 9:
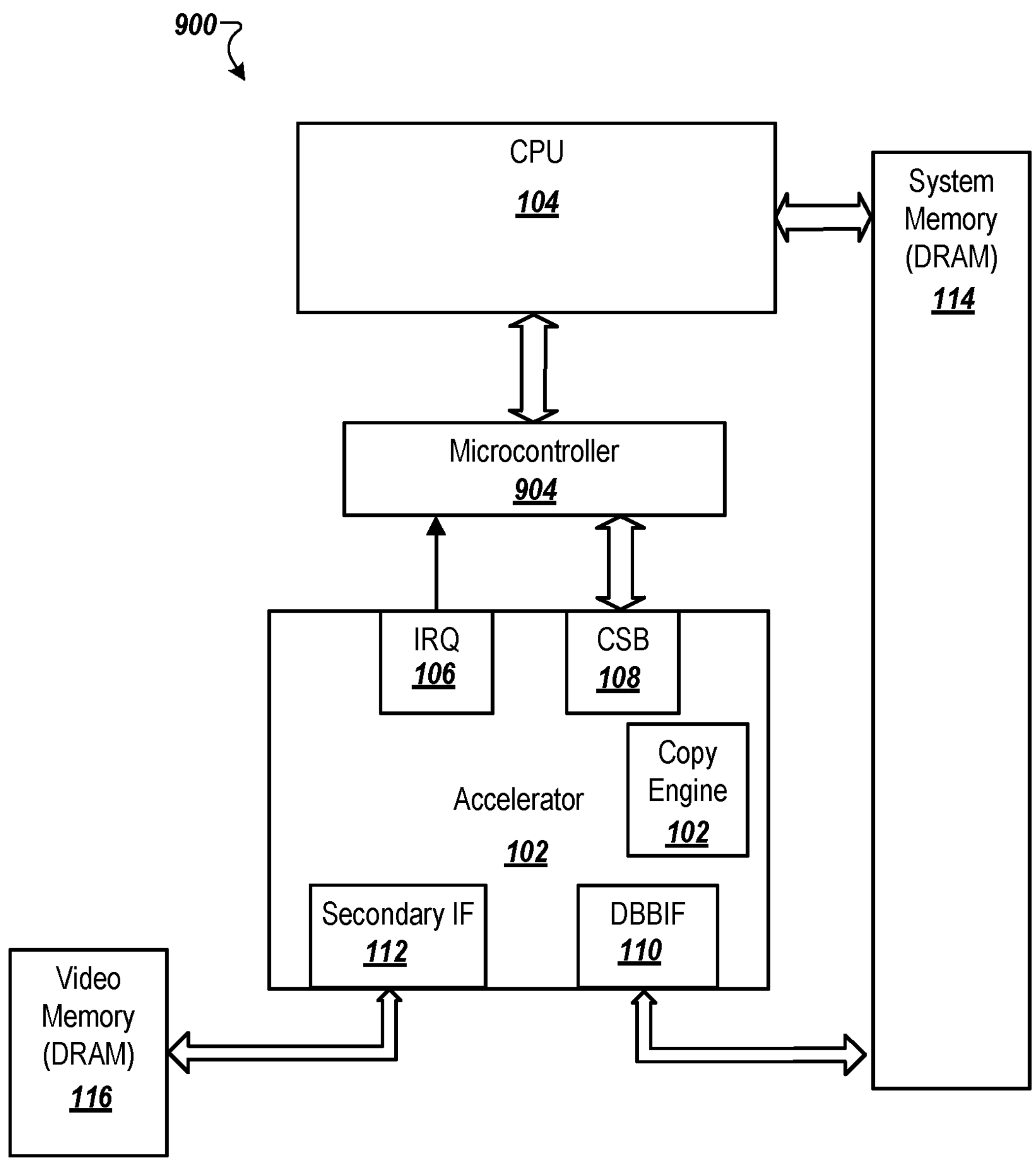
FIG. 9 is a block diagram of a computing system with an accelerator including a copy engine that support fairness among multiple users or multiple data streams of the computing system, in accordance with at least some embodiments.

FIG. 9 is a block diagram of a computing system 900 with an accelerator including a copy engine that supports fairness among multiple users or multiple data streams of the computing system, in accordance with at least some embodiments. The computing system 900 is considered a headed system in which a main system processor, CPU 104 delegates high-interrupt-frequency tasks to a companion microcontroller 904 coupled to the accelerator circuit 102. The computing system 900 is similar to computing system 100 as noted by similar reference numbers, except the computing system 900 includes the companion microcontroller 904. The computing system 900 can be considered a larger system that is characterized by the addition of a dedicated control coprocessor and can include high-bandwidth SRAM to support the accelerator circuit 102.

In some cases, the larger model in FIG. 9 is used when higher performance and versatility are needed. Performance-oriented systems may perform inference on many different network topologies; thus, they maintain a high degree of flexibility. Additionally, these systems may perform many tasks simultaneously, rather than serializing inference operations, so inference operations would not consume too much processing power on the CPU 104. The accelerator circuit 102 can include a memory interface that couples to a dedicated high-bandwidth SRAM to address these needs. The SRAM can be used as a cache by the accelerator circuit 102. The SRAM can also be used by other high-performance computer-vision-related components on the system to further reduce traffic to the main system memory 114 (e.g., DRAM). The accelerator circuit 102 enables the interface with the microcontroller 904 (or a dedicated control coprocessor) to limit the interrupt load on the CPU 104. In at least one embodiment, the microcontroller 904 can be a RISC-V-based PicoRV32 processor, an ARM Cortex-M or Cortex-R processors, or other microcontroller designs. Using a dedicated coprocessor (microcontroller 904), the host processor (CPU 104) can handle some tasks associated with managing the accelerator circuit 102. For example, although the hardware scheduler circuit is responsible for scheduling and fine-grained programming of the accelerator circuit 102, the microcontroller 904 or CPU 104 can still handle some coarse-grained scheduling of the accelerator circuit 102, input-output memory management (IOMMU) mappings of memory access, as needed, memory allocation of input data and fixed weight arrays on accelerator circuit 102, and synchronization between other system components and tasks that run on the accelerator circuit 102.

The techniques disclosed herein may be incorporated in any processor that may be used for processing a neural network, such as, for example, a central processing unit (CPU), a GPU, a deep learning accelerator (DLA) circuit, an intelligence processing unit (IPU), neural processing unit (NPU), tensor processing unit (TPU), a neural network processor (NNP), a data processing unit (DPU), a vision processing unit (VPU), an application-specific integrated circuit (ASIC), a field-programmable gate array (FPGA), and the like. Such a processor may be incorporated in a personal computer (e.g., a laptop), at a data center, in an Internet of Things (IoT) device, a handheld device (e.g., smartphone), a vehicle, a robot, a voice-controlled device, or any other device that performs inference, training or any other processing of a neural network. Such a processor may be employed in a virtualized system such that an operating system executing in a virtual machine on the system can utilize the processor.

As an example, a processor incorporating the techniques disclosed herein can be employed to process one or more neural networks in a machine to identify, classify, manipulate, handle, operate, modify, or navigate around physical objects in the real world. For example, such a processor may be employed in an autonomous vehicle (e.g., an automobile, motorcycle, helicopter, drone, plane, boat, submarine, delivery robot, etc.) to move the vehicle through the real world. Additionally, such a processor may be employed in a robot at a factory to select components and assemble components into an assembly.

As an example, a processor incorporating the techniques disclosed herein can be employed to process one or more neural networks to identify one or more features in an image or alter, generate, or compress an image. For example, such a processor may be employed to enhance an image rendered using raster, ray-tracing (e.g., using NVIDIA RTX), and/or other rendering techniques. In another example, such a processor may be employed to reduce the amount of image data that is transmitted over a network (e.g., the Internet, a mobile telecommunications network, a WIFI network, as well as any other wired or wireless networking system) from a rendering device to a display device. Such transmissions may be utilized to stream image data from a server or a data center in the cloud to a user device (e.g., a personal computer, video game console, smartphone, other mobile devices, etc.) to enhance services that stream images such as NVIDIA GeForce Now (GFN), Google Stadia, and the like.

As an example, a processor incorporating the techniques disclosed herein can be employed to process one or more neural networks for any other types of applications that can take advantage of a neural network. For example, such applications may involve translating languages, identifying and negating sounds in audio, detecting anomalies or defects during the production of goods and services, surveillance of living beings and non-living things, medical diagnosis, making decisions, and the like.

Other variations are within the spirit of the present disclosure. Thus, while disclosed techniques are susceptible to various modifications and alternative constructions, certain illustrated embodiments are shown in drawings and described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if something is intervening. Recitation of ranges of values herein is merely intended to serve as a shorthand method of referring individually to each separate value falling within the range unless otherwise indicated herein. Each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B, and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B, and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when indicated explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more individual non-transitory storage media of multiple non-transitory computer-readable storage media lacks all of the code while multiple non-transitory computer-readable storage media collectively store all of the code. In at least one embodiment, executable instructions are executed such that different instructions are executed by different processors—for example, a non-transitory computer-readable storage medium stores instructions and a main central processing unit ("CPU") executes some of the instructions while a graphics processing unit ("GPU") and/or a data processing unit ("DPU")—potentially in conjunction with a GPU)—executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or a similar electronic computing device, that manipulates and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, a "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as a system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or an interprocess communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. An accelerator circuit comprising:

a secure memory;

a scheduler circuit; and a direct memory access (DMA) circuit coupled to the scheduler circuit and the secure memory, wherein the DMA circuit comprises a cryptographic circuit that implements an authenticated encryption algorithm to encrypt retrieved data from the secure memory or decrypt received data to be stored in the secure memory, wherein the scheduler circuit is to:

receive, from a first application, a first descriptor of a first data transfer of a first size, the first descriptor specifying a first index in the secure memory corresponding to the first application; and split the first data transfer into a first set of portions, each portion being less than or equal to the first size and required to complete execution before a context switch to another application;

wherein the DMA circuit is to:

during a first period, execute a first subset of the first set of portions sequentially using a first initialization vector (IV) and a first encryption key associated with the first application, and store a first computed hash key and a first block counter in the secure memory at the specified first index; and during a second period subsequent to the first period, execute a second subset of the first set of portions sequentially using the first computed hash key and the first block counter stored in the secure memory at the specified first index, and store a first authentication tag associated with the first data transfer.

2. The accelerator circuit of claim 1, wherein:

the scheduler circuit is further to:

receive, from a second application, a second descriptor of a second data transfer of a second size, the second descriptor specifying a second index in the secure memory corresponding to the second application; and split the second data transfer into a second set of portions, each portion being less than or equal to the second size and required to complete execution before a context switch to another application;

the DMA circuit is further to:

during a third period, execute a first subset of the second set of portions sequentially using a second IV and a second encryption key associated with the second application;

at an end of the third period, store a second computed hash key and a second block counter in the secure memory at the specified second index;

during a fourth period subsequent to the third period, execute a second subset of the second set of portions sequentially using the second computed hash key and the second block counter stored in the secure memory at the specified second index; and at an end of the fourth period, store a second authentication tag associated with the second data transfer.

3. The accelerator circuit of claim 2, wherein the first size and the second size are different, and wherein the scheduler circuit is configured to guarantee fairness across the first application and the second application for Quality of Service (QoS) requirements independent of the first size and the second size.

4. The accelerator circuit of claim 2, further comprising a DMA buffer to store a first pushbuffer for the first application and a second pushbuffer for the second application, wherein the first pushbuffer stores specifications of operations to be performed for the first application and the first index, and wherein the second pushbuffer stores specifications of operations to be performed for the second application and the second index.

5. The accelerator circuit of claim 4, wherein the DMA buffer is to store a third pushbuffer for the second application, wherein the second pushbuffer stores a semaphore at an end of the second pushbuffer to be released by the DMA circuit.

6. The accelerator circuit of claim 1, wherein the authenticated encryption algorithm is Advanced Encryption Standard Galois Counter Mode (AES-GCM).

7. The accelerator circuit of claim 1, wherein the first descriptor is an encryption operation descriptor, wherein the DMA circuit is further to:

retrieve the first IV and the first encryption key from the secure memory;

encrypt the first IV and a first value of the first block counter with a first block cipher using the first encryption key to obtain a first result;

encrypt the first IV and a second value of the first block counter with a second block cipher using the first encryption key to obtain a second result;

combine the second result and first plaintext to obtain first ciphertext;

combine the first ciphertext with a zero block to obtain a first value for the first computed hash key, wherein the first value is a partial authentication tag for the first data transfer;

retrieve the first IV, a current value of the first block counter, and a current value of the first computed hash key;

encrypt the first IV and the current value of the first block counter with a third block cipher using the first encryption key to obtain a third result;

combine the third result and second plaintext to obtain second ciphertext;

combine the second ciphertext and the current value of the first computed hash key to obtain a fourth result;

combine the fourth result with a length of ciphertext to obtain a fifth result; and combine the fifth result with the first result to obtain a first authentication tag.

8. The accelerator circuit of claim 1, wherein the first descriptor is a decryption operation descriptor, wherein the DMA circuit is further to:

retrieve the first IV and the first encryption key from the secure memory;

encrypt the first IV and a first value of the first block counter with a first block cipher using the first encryption key to obtain a first result;

encrypt the first IV and a second value of the first block counter with a second block cipher using the first encryption key to obtain a second result;

combine the second result and first ciphertext to obtain first plaintext;

combine the first ciphertext and a zero block to obtain a first value for the first computed hash key, wherein the first value is a partial authentication tag for the first data transfer;

retrieve the first IV, a current value of the first block counter, and a current value of the first computed hash key;

encrypt the first IV and the current value of the first block counter with a third block cipher using the first encryption key to obtain a third result;

combine the third result and second ciphertext to obtain second plaintext;

combine the second plaintext and the current value of the first computed hash key to obtain a fourth result;

combine the fourth result with a length of ciphertext to obtain a fifth result; and combine the fifth result with the first result to obtain a first authentication tag.

9. The accelerator circuit of claim 1, wherein the accelerator circuit is a graphics processing unit (GPU), a deep learning accelerator (DLA) circuit, an intelligence processing unit (IPU), a neural processing unit (NPU), a tensor processing unit (TPU), a neural network processor (NNP), a data processing unit (DPU), a vision processing unit (VPU), an application-specific integrated circuit (ASIC), or a field-programmable gate array (FPGA).

10. The accelerator circuit of claim 1, wherein the DMA circuit comprises:

a logical compute engine (LCE);

a first physical compute engine (PCE) coupled to the LCE and comprising the cryptographic circuit, a first read pipeline, and a first write pipeline; and a second PCE coupled to the LCE and comprising a second cryptographic circuit, a second read pipeline, and a second write pipeline.

11. A method comprising:

receiving, by an accelerator circuit, a first descriptor of a first data transfer of a first size associated with a first application, the first descriptor specifying a first index in secure memory corresponding to the first application;

splitting, by the accelerator circuit, the first data transfer into a first set of portions, each portion being less than or equal to the first size and required to complete execution before a context switch to another application;

during a first period, executing, by the accelerator circuit, a first subset of the first set of portions sequentially using an authenticated encryption algorithm with a first initialization vector (IV) and a first encryption key associated with the first application, and storing, by the accelerator circuit, a first computed hash key and a first block counter in the secure memory at the specified first index; and during a second period subsequent to the first period, executing, by the accelerator circuit, a second subset of the first set of portions sequentially using the first computed hash key and the first block counter stored in the secure memory at the specified first index, and storing, by the accelerator circuit, a first authentication tag associated with the first data transfer.

12. The method of claim 11, further comprising:

receiving, by the accelerator circuit, a second descriptor of a second data transfer of a second size associated with a second application, the second descriptor specifying a second index in the secure memory corresponding to the second application;

splitting, by the accelerator circuit, the second data transfer into a second set of portions, each portion being less than or equal to the second size and required to complete execution before a context switch to another application;

executing, by the accelerator circuit during a third period, a first subset of the second set of portions sequentially using a second IV and a second encryption key associated with the second application;

storing, by the accelerator circuit at an end of the third period, a second computed hash key and a second block counter in the secure memory at the specified second index;

executing, by the accelerator circuit during a fourth period subsequent to the third period, a second subset of the second set of portions sequentially using the second computed hash key and the second block counter stored in the secure memory at the specified second index; and storing, by the accelerator circuit at an end of the fourth period, a second authentication tag associated with the second data transfer.

13. The method of claim 11, wherein the authenticated encryption algorithm is Advanced Encryption Standard Galois Counter Mode (AES-GCM).

14. The method of claim 11, wherein the first descriptor is an encryption operation descriptor, and wherein the method further comprises:

retrieving the first IV and the first encryption key from the secure memory;

encrypting the first IV and a first value of the first block counter with a first block cipher using the first encryption key to obtain a first result;

encrypting the first IV and a second value of the first block counter with a second block cipher using the first encryption key to obtain a second result;

combining the second result and first plaintext to obtain first ciphertext;

combining the first ciphertext with a zero block to obtain a first value for the first computed hash key, wherein the first value is a partial authentication tag for the first data transfer;

retrieving the first IV, a current value of the first block counter, and a current value of the first computed hash key;

encrypting the first IV and the current value of the first block counter with a third block cipher using the first encryption key to obtain a third result;

combining the third result and second plaintext to obtain second ciphertext;

combining the second ciphertext and the current value of the first computed hash key to obtain a fourth result;

combining the fourth result with a length of ciphertext to obtain a fifth result; and combining the fifth result with the first result to obtain a first authentication tag.

15. The method of claim 11, wherein the first descriptor is a decryption operation descriptor, wherein the method further comprises:

retrieving the first IV and the first encryption key from the secure memory;

encrypting the first IV and a first value of the first block counter with a first block cipher using the first encryption key to obtain a first result;

encrypting the first IV and a second value of the first block counter with a second block cipher using the first encryption key to obtain a second result;

combining the second result and first ciphertext to obtain first plaintext;

combining the first ciphertext and a zero block to obtain a first value for the first computed hash key, wherein the first value is a partial authentication tag for the first data transfer;

retrieving the first IV, a current value of the first block counter, and a current value of the first computed hash key;

encrypting the first IV and the current value of the first block counter with a third block cipher using the first encryption key to obtain a third result;

combining the third result and second ciphertext to obtain second plaintext;

combine the second ciphertext and the current value of the first computed hash key to obtain a fourth result;

combining the fourth result with a length of ciphertext to obtain a fifth result; and combining the fifth result with the first result to obtain a first authentication tag.

16. An accelerator circuit comprising:

a copy engine (CE) comprising Advanced Encryption Standard Galois Counter Mode (AES-GCM) hardware configured to perform both encryption and authentication for a plurality of applications, wherein the CE comprises secure memory to store a first context comprising a first encryption key, a first initialization vector (IV), a first hash key, and a first block counter associated with a first application of the plurality of applications, and a second context comprising a second encryption key, a second IV, a second hash key, and a second block counter associated with a second application of the plurality of applications;

an engine scheduler coupled to the CE, wherein:

the engine scheduler is to:

receive an encryption or decryption operation descriptor of a first data transfer of a specified size for the first application; and split the first data transfer into a set of partial transfers, each partial transfer having a fixed size less than or equal to the specified size and be required to be completed before a context switch to another application;

the copy engine (CE) is to:

sequentially execute the set of partial transfers using the first context until a timeslice timeout for the first application; and in response to the timeslice timeout for the first application, store a current value for the first hash key and a current value for the first block counter in the secure memory computed from a last partial transfer completed before the timeslice timeout.

17. The accelerator circuit of claim 16, wherein the CE is further to:

retrieve the current value for the first hash key and the current value for the first block counter from the secure memory;

sequentially execute remaining partial transfers of the set of partial transfers using the current value for the first hash key and the current value for the first block counter until a second timeslice timeout for the first application; and in response to the second timeslice timeout for the first application, store a second current value for the first hash key and a second current value for the first block counter in the secure memory computed from a last partial transfer completed before the second timeslice timeout.

18. The accelerator circuit of claim 16, wherein the CE is further to:

retrieve the current value for the first hash key and the current value for the first block counter from the secure memory;

sequentially execute remaining partial transfers of the set of partial transfers using the current value for the first hash key and the current value for the first block counter until a second timeslice timeout for the first application; and in response to the second timeslice timeout for the first application, store an authentication tag computed in a last partial transfer of the set of partial transfers.

19. The accelerator circuit of claim 16, wherein the accelerator circuit is a graphics processing unit (GPU), a deep learning accelerator (DLA) circuit, an intelligence processing unit (IPU), a neural processing unit (NPU), a tensor processing unit (TPU), a neural network processor (NNP), a data processing unit (DPU), a vision processing unit (VPU), an application-specific integrated circuit (ASIC), or a field-programmable gate array (FPGA).

20. The accelerator circuit of claim 16, wherein the CE comprises:

a logical compute engine (LCE); and a first physical compute engine (PCE) coupled to the LCE and comprising a first AES-GCM circuit, a first read pipeline, and a first write pipeline; and a second PCE coupled to the LCE and comprising a second AES-GCM circuit, a second read pipeline, and a second write pipeline.

* * * * *